United States Patent
Lopez et al.

(10) Patent No.: US 12,409,842 B1
(45) Date of Patent: Sep. 9, 2025

(54) FAULT DETECTION AND MONITOR FOR ISSUING VEHICLE CONSTRAINTS

(71) Applicant: Zoox, Inc., Foster City, CA (US)

(72) Inventors: Matthew Daniel Lopez, Morgan Hill, CA (US); Collin MacGregor, Foster City, CA (US); Michael Isaac Mizrahi, San Mateo, CA (US); Aravind Sarma Vadali, San Mateo, CA (US)

(73) Assignee: Zoox, Inc., Foster City, CA (US)

( * ) Notice: Subject to any disclaimer, the term of this patent is extended or adjusted under 35 U.S.C. 154(b) by 387 days.

(21) Appl. No.: 17/204,643

(22) Filed: Mar. 17, 2021

(51) Int. Cl.
   B60W 50/02 (2012.01)
   B60W 60/00 (2020.01)

(52) U.S. Cl.
   CPC .... B60W 50/0205 (2013.01); B60W 50/0225 (2013.01); B60W 60/0015 (2020.02); *B60W 2510/18* (2013.01)

(58) Field of Classification Search
   CPC ......... B60W 50/0205; B60W 60/0015; B60W 50/0225; B60W 2510/18
   See application file for complete search history.

(56) References Cited

U.S. PATENT DOCUMENTS

| | | | | |
|---|---|---|---|---|
| 8,768,552 B2 * | 7/2014 | Krueger | ..................... | B60L 7/26 701/79 |
| 9,889,829 B2 * | 2/2018 | Backes | ................. | B60T 17/228 |
| 10,239,531 B2 * | 3/2019 | Kilmurray | ...... | B60W 30/18136 |
| 10,850,742 B2 * | 12/2020 | Nilsson | ................. | B60W 10/20 |
| 10,962,973 B2 * | 3/2021 | Kazemi | ............. | B60W 30/0953 |
| 11,079,764 B2 * | 8/2021 | Nister | ................... | G05D 1/0221 |
| 11,231,723 B2 * | 1/2022 | Lee | ........................ | B60W 10/18 |
| 11,884,295 B2 * | 1/2024 | Shin | ....................... | B60W 30/09 |
| 2016/0375911 A1 * | 12/2016 | Coelingh | ......... | B60W 50/0205 701/23 |
| 2018/0086351 A1 * | 3/2018 | Zhu | ....................... | B60W 30/16 |
| 2018/0348771 A1 * | 12/2018 | Chu | ................... | B60W 60/0018 |
| 2022/0017060 A1 * | 1/2022 | De Haseth | ............... | B60T 7/12 |
| 2022/0363276 A1 * | 11/2022 | Wulf | ............... | B60W 30/18163 |

FOREIGN PATENT DOCUMENTS

| | | | | |
|---|---|---|---|---|
| CN | 106864447 B | * | 5/2019 | |
| CN | 111114518 A | * | 5/2020 | ............. B60T 17/22 |

OTHER PUBLICATIONS

"Kocsis, M; Submann, N; Buyer, J; Zollner, R; Safety Concept for Autonomous Vehicles that Operate in Pedestrian Areas; Dec. 2017; IEEE/SICE International Symposium on System Integration" (Year: 2017).*

* cited by examiner

*Primary Examiner* — Peter D Nolan
*Assistant Examiner* — Christopher R Cardimino
(74) *Attorney, Agent, or Firm* — Lee & Hayes, P.C.

(57) ABSTRACT

Techniques for controlling a vehicle to safely perform a maneuver are discussed herein. For example, techniques can include determining, based on diagnostic data associated with the vehicle, a first constraint to be applied by a vehicle system of the vehicle. At a first instance, the first constraint may be transmitted to the vehicle system. The systems and/or methods may determine an absence of an action by the vehicle that is associated with first constraint and determine a second constraint to be applied by the vehicle system. At a second instance, the second constraint may be transmitted to the vehicle system. The second constraint may be associated with an emergency stop to ensure the safety of passengers within the vehicle and persons and objects in a surrounding environment.

20 Claims, 5 Drawing Sheets

FAULT DETECTION AND MONITOR FOR ISSUING VEHICLE CONSTRAINTS

BACKGROUND

Various methods, apparatuses, and systems are utilized by autonomous vehicles to guide such autonomous vehicles through environments. For instance, autonomous vehicles may utilize route planning methods, apparatuses, and systems to guide autonomous vehicles through congested areas with other moving vehicles (autonomous or otherwise), moving people, stationary buildings, etc. In some examples, an autonomous vehicle may make decisions while traversing an environment to ensure safety for passengers and surrounding persons and objects, such as to avoid collisions with objects in the surrounding environment. A variety of systems may contribute to assist the autonomous vehicle with navigating the environment. Occasionally, one or more of these systems may experience a fault or error, which may affect how the autonomous vehicle traverses the environment. Determining how the autonomous vehicle will handle a fault or error may, at times, present challenges.

BRIEF DESCRIPTION OF THE DRAWINGS

The detailed description is described with reference to the accompanying figures. In the figures, the left-most digit(s) of a reference number identifies the figure in which the reference number first appears. The use of the same reference numbers in different figures indicates similar or identical components or features, in accordance with examples of the disclosure.

DETAILED DESCRIPTION

Figure 1:
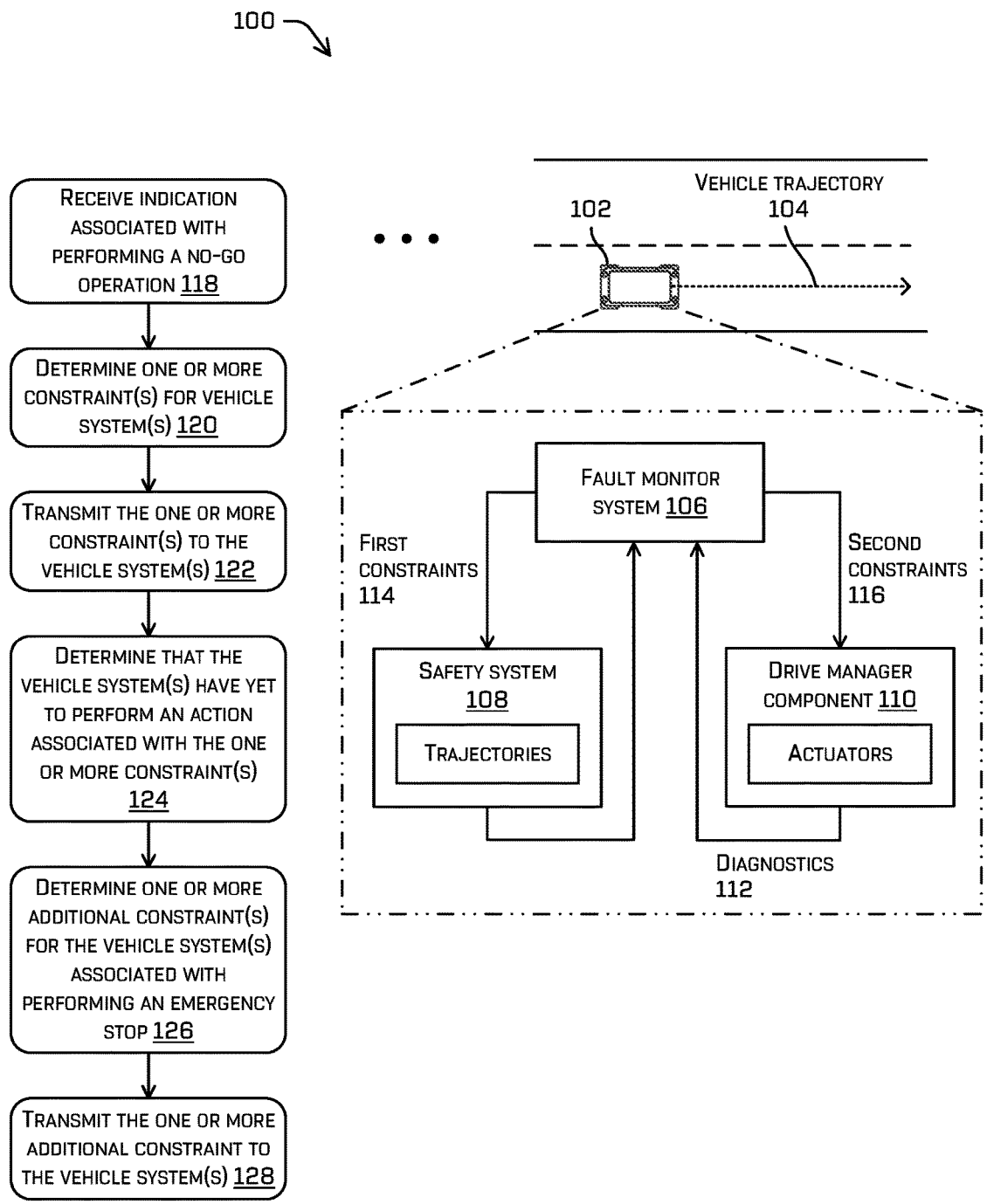
FIG. 1 illustrates an example pictorial flow diagram of an example process for issuing constraints to vehicle system(s) and determining faults within the vehicle system(s), according to an embodiment of the present disclosure.

This disclosure describes, in part, techniques for managing constraints of vehicle system(s) of a vehicle, such as an autonomous vehicle, to enable the vehicle to respond safely and appropriately to the constraints. In some instances, the vehicle may include any number of systems that enable the vehicle to traverse an environment, such as a drive system, a planning system, a perception system, a safety system, electronic control units (ECUs), and so forth. In some instances, the vehicle system(s) may be constrained to certain operations or operate under certain constraints based on experiencing one or more faults (or as otherwise instructed). Generally, a fault may correspond to an error or other diagnostic associated with the vehicle system(s) (e.g., functionality of the vehicle system(s) is not working properly). Different faults may have different constraints that direct the vehicle to proceed in a certain way such that damage to the vehicle is prevented and/or minimized. This may also ensure the safety of passengers and persons, as well as objects in the surrounding environment. Moreover, the constraints may be issued for safety controlling the vehicle. For example, constraints may be output to certain vehicle system(s) for controlling braking, speed, trajectories, and so forth. In instances where the vehicle does not perform as instructed (e.g., according to the constraint), a fault may occur and in response, further constraint(s) may be output for performing a corrective action such as an emergency stop. The described techniques can include a centralized fault monitor system for detecting faults across different vehicle system(s) and communicating constraint(s) to appropriate vehicle system(s).

The vehicle may include a fault monitor system communicatively coupled to vehicle system(s) of the vehicle, such as sensor systems, perception systems, planning systems, control systems, safety systems, or the like. The fault monitor system may receive various forms of data from these, and other, systems associated with an operation of the vehicle. By way of example and not limitation, the data may indicate routes of the vehicle, speeds of the vehicle, accelerations of the vehicle, steering of the vehicle, trajectories of the vehicle, sensed objects (e.g., people, other vehicles, vegetation, etc.), diagnostics associated with the vehicle (e.g., health of sensors, health of actuators, a parameter of condition in machinery, such as vibration, temperature, etc.), and so forth. In some instances, these vehicle system(s) may be respectively controlled by computing device(s) of the vehicle. For example, the computing device(s) may cause the vehicle to travel along a desired route according to certain speeds.

In some instances, the fault monitor system may receive diagnostics of the vehicle system(s) for use in determining faults (e.g., errors) that may require bringing the vehicle to a safe stop. The fault monitor system, based on receiving the diagnostics, may issue a constraint (e.g., instruction, command, request, etc.) to vehicle system(s) that determine a trajectory of the vehicle and/or otherwise control the vehicle. In most circumstances, the vehicle may travel along the determined trajectory for a safe stop. As part of this, a deacceleration profile associated with braking the vehicle and/or controlling the vehicle along the trajectory may be determined. In response to issuing the constraint, the fault monitor system (or another vehicle system(s)) may monitor the operation of the vehicle to determine whether the vehicle is in fact deaccelerating along the trajectory. If the vehicle is not performing as expected within a threshold amount of time, the fault monitor system may issue a subsequent constraint associated with performing an emergency stop.

As the vehicle travels along a route, the fault monitor system may receive data from the vehicle system(s) for diagnosing vehicle system(s), determining one or more faults of the vehicle, and/or determining constraint(s) to apply to the vehicle. These constraints may be transmitted from the fault monitor system to the vehicle system(s) for execution. In some instances, the fault monitor system may transmit the constraints and the vehicle system(s) (or other communicatively coupled devices or system(s)) may determine actions, commands, and/or operations that are responsive to the constraints. For example, the vehicle system(s) may determine action(s) to perform in accordance with the issued constraints.

The fault monitor system may centralize constraints of the vehicle to reduce inconsistent or conflicting operations. For example, the fault monitor system may represent a component of the vehicle that issues the constraints, and other components may be restricted from issuing constraints. In this sense, vehicle system(s) may be prohibited from issuing constraints and the fault monitor system may serve as a component of the vehicle that issues the constraints. Noted above, however, the vehicle system(s) may be configured to act in accordance with the constraints or request constraint(s) (e.g., when the vehicle is not operating as expected). Additionally, the vehicle system(s) may communicate with one another for carrying out action(s) consistent with the constraints. As a brief example, in response to an issued constraint, the drive system(s) may receive a trajectory or route from other vehicle system(s) along which to travel. In response, the drive system(s) may cause the vehicle to travel along the route and/or monitor an execution of the vehicle travel along the route.

In some instances, the fault monitor system may issue constraints that are associated with performing safe maneuvers or bringing the vehicle to a safe stop. For example, the safety system may determine a safe maneuver as part the fault monitor system issuing constraints. In some instances, the safety system may request the issuance of a constraint from the fault monitor system based on determining an occurrence of a predicted collision between the vehicle and another object (e.g., another vehicle, person, etc.). In these, and other instances, the safety system may determine a trajectory of the vehicle based on the fault monitor system determining faults within the vehicle, receiving the diagnostic data, and/or safety system determining a predicted collision. For example, the fault monitor system may issue a constraint to the safety system to determine a trajectory on which the vehicle is to travel to avoid the collision. In some instances, this may also include the vehicle deaccelerating according to a certain deacceleration profile. For example, the fault monitor system may issue a constraint to the drive system(s) for braking the vehicle along the determined trajectory and/or according to the deacceleration profile. In some instances, and as used throughout this application, bringing the vehicle to a safe stop may be referred to as a "no-go" operation.

In some examples, various stopping operations can include different stopping trajectories. For example, a no-go operation can include controlling the vehicle to follow a first stopping trajectory that can include a first deceleration profile where the vehicle is controlled to follow the steering commands of the latest driving trajectory. A second stopping operation (e.g., an emergency stopping operation) can include controlling the vehicle to follow a second stopping trajectory that can include a second deceleration profile (e.g., greater than the first deceleration profile, such as a maximum deceleration) while locking the steering at its last valid command.

In response to the issued constraints, these vehicle system(s) may respectively determine actions to perform, whether dependently or independently. For example, the drive system(s) may apply brakes to the vehicle and/or steer the vehicle. As part of this process, the safety system and the drive system(s) may be constrained to perform the safe maneuver, or actions consistent with the safe maneuver. For example, the safety system may not determine trajectories other than the safe maneuver and the drive system(s) may not drive according to other requests (e.g., steer, accelerate, etc.).

The fault monitor system may oversee the vehicle system(s) to determine whether the issued constraints are being followed. In this sense, the fault monitor system may itself determine whether the vehicle is operating in accordance with the constraints. For example, after issuing the constraints, the fault monitor system may monitor the vehicle system(s) (or more generally, the vehicle) to determine whether actions consistent with the constraints are being performed. In some instances, the fault monitor system may receive feedback (e.g., diagnostics) from the vehicle system(s) for use in determining whether the constraints are being executed or whether the vehicle is operating consistent with the issued constraints. In some instances, this feedback may be received according to predetermined schedules (e.g., every millisecond, second, etc.).

Additionally, or alternatively, the vehicle system(s) may determine whether the vehicle is operating in accordance with the issued constraints. For example, the drive system(s) may determine whether the vehicle is deaccelerating (e.g., braking) along the trajectory and by an amount consistent with the deacceleration profile. The drive system(s) may provide feedback (e.g., diagnostic data) to the fault monitor system according to the current operational state of the vehicle, and/or whether the vehicle is operating according the constraints. In some instances, the drive system(s), for example, may issue requests to the fault monitor system for issuing subsequent constraints, such as an emergency stop request. For example, the drive system(s) may determine that the vehicle is not deaccelerating along the trajectory, and in response, may transmit a diagnostic to the fault monitor system associated with the lack or insufficient braking. Therein, the fault monitor system may issue an updated constraint to the vehicle system(s).

In other words, where the vehicle is not operating according to the constraints, this may be indicative of a fault one or more vehicle system(s). That is, if the drive system is not applying the brakes according to a previously issued constraint, or the brakes are not braking the vehicle, the fault monitor system may issue the emergency stop constraint. This may cause the vehicle system(s) to perform additional action(s) consistent with the emergency stop (or updated constraints). Responsive to the request from the fault monitor system for performing an emergency stop, the drive system may deaccelerate by a maximum and safe amount, lock steering, and so forth. Other vehicle system(s) may be instructed to perform action(s) consistent with the emergency stop as well. For example, the safety system may determine an updated trajectory and/or updated deacceleration profile for stopping the vehicle. In some instances, during the emergency stop constraint, the vehicle system(s) may be prohibited from performing operations, such as accelerating, traveling at certain speeds, and so forth.

In some instances, if the constraints are not performed within a threshold amount of time the fault monitor system may issue the emergency stop constraint. For example, after the fault monitor system issues the constraints for performing a safe maneuver, responsive to the diagnostic data, the fault monitor system (or another vehicle system(s)) may determine whether the vehicle is operating in accordance with the issued constraint within a threshold amount of time. If the vehicle is not operating in accordance with the constraint within the threshold amount of time, such as braking, the fault monitor system issue the emergency stop constraint.

In some instances, the fault monitor system may determine a dynamic threshold amount of time associated with the action(s) being performed by the vehicle system(s). In some instances, the threshold amount of time may be based at least in part on the constraint, a current speed, acceleration, bearing of the vehicle, other environmental conditions (e.g., rain, ice, etc.), and so forth. For example, if the fault monitor system issues a constraint to perform a no-go operation, which may control the vehicle to deaccelerate by a certain amount over a certain period of time, and the vehicle is not deaccelerating by the certain amount within the threshold amount of time, the emergency stop constraint may be issued. The emergency stop constraint, as alluded to above, may apply more restrictive constraints than the previously issued constraint (e.g., maximum braking). However, the amount of time associated with determining whether the vehicle system(s) have acted in accordance with the constraints may be dependent on characteristics of the vehicle and/or the constraint.

Turning to an illustrative example, envision that the fault monitor system issues a no-go constraint to the drive system. In this example, the drive system may control various actuators, such as steering actuators, brake actuators, drive actuators, suspension actuators, and so forth. The constraint may generally include a command, instruction, or request for operating according to the no-go constraint. This may, in some instances, include an amount of braking to be applied and/or deacceleration profile along which the drive system is to apply the brakes (e.g., between a starting location and ending position). That is, the drive system may act in response to the no-go constraint and control the brakes of the vehicle. Here, the fault monitor system may not communicate directly with the brakes (or controller thereof) for braking the vehicle. Rather, the fault monitor system may communicate with a vehicle system (e.g., the drive system) that is responsible for braking the vehicle. As part of issuing the no-go constraint, the fault monitor system may start a timer or record at time at which the no-go constraint was issued. Therein, the fault monitor system may receive feedback from the drive system or otherwise determine actions being performed by the drive system (or more generally, the vehicle). For example, the feedback may indicate an amount of braking by the drive system, whether brakes are being applied, and so forth. This feedback may be received in the form of diagnostic data. In response, the fault monitor system may determine whether the brakes are being applied properly and in accordance with the no-go constraint. If not, the fault monitor system may issue the emergency stop constraint to the vehicle system(s). Moreover, if the fault monitor system has not received any feedback within the threshold amount of time after issuing the no-go constraint (e.g., unresponsive), the fault monitor system may issue the emergency stop constraint. As such, the fault monitor system may monitor a performance of the constraints for issuing subsequent constraints to ensure the safety of passengers, bystanders, and surrounding environment.

Additionally, or alternatively, in some instances, the vehicle system(s) may begin a timer at the receipt of the constraint and determine whether the vehicle system(s) is acting in accordance with the constraint within a certain amount of time. For example, the drive system may determine whether the vehicle is braking consistent with the no-go operation (or along a certain trajectory). If not, the drive system may issue a request to the fault monitor system associated with issuing a sequent constraint for performing the emergency stop. That is, the drive system may request a constraint to the fault monitor system for performing the emergency stop.

Although the above example illustrates providing the no-go constraint to the drive system, it is to be understood that the fault monitor system may issue the no-go constraint to other vehicle system(s). These vehicle system(s) may perform action(s) in parallel, or consecutive with, the action(s) performed by the drive system. For example, the fault monitor system may issue the no-go constraint to the safety system for determining a trajectory along which to travel. In some instances, as part of this, the safety system may provide the trajectory to the drive system to allow the drive system to steer, brake, and/or otherwise control the vehicle along the trajectory.

In some instances, rather receiving feedback and determining whether the vehicle system(s) are performing action(s) consistent the constraints, as alluded to above, the fault monitor system may receive diagnostic data associated with fault(s) of the vehicle. In some instances, the diagnostic data may be associated with operational states of the vehicle system(s), task(s) being performed by the vehicle system(s), temperature, applied voltage, pressures, etc. For example, diagnostic data may be received from one or more of the vehicle system(s), where the diagnostic data may indicate a fault (e.g., unresponsive steering actuator) of the vehicle system (or another, different vehicle system). Additionally, in some instances, the diagnostic data may be representative of current operating conditions of the vehicle system(s). For example, the diagnostic data may indicate a charge within batteries of the vehicle, a current processing load on computing device(s), a traction of wheels of the vehicle, and so forth. In such instances, the diagnostic data may not be indicative of faults at the vehicle, but may indicate normal operating parameters of the vehicle, current operating conditions, a present state of the vehicle, etc. In other words, the diagnostic data may not be limited to being indicative faults, but more generally, the diagnostic data may be used issue constraints to the vehicle based on certain events (even in instances where faults are not detected). As an example, if vehicle senses certain environment conditions (e.g., rain, snow, etc.), the vehicle may be constrained to traveling at certain speeds.

In some instances, the vehicle system(s) may supply the fault monitor system with respective diagnostics that map to the same fault. In such instances, the fault monitor system may determine duplicative faults and act as a centralized system for organizing and managing faults. Fault indications may also be received from the fault monitor system itself. That is, the fault monitor system may determine the occurrence of a fault within the vehicle system(s). In some instances, the diagnostic data may include information such as an identification of the fault type (e.g., non-responsive brake caliper), a fault reaction (e.g., an instruction for the vehicle to resolve the fault), and the like.

In some instances, the fault monitor system may prioritize fault received from the vehicle system(s). The fault monitor system may also prioritize constraints transmitted to the vehicle system(s). The prioritization of the faults and/or the constraints may ensure the safety of passengers, persons, and objects in the surrounding environment. For example, the fault monitor system may select the most restrictive constraint, and use the most restrictive constraint to control the action(s) of the vehicle to resolve the faults and ensure safety of passengers, surrounding environment, and other persons.

Although discussed in the context of an autonomous vehicle, the methods, apparatuses, and systems described herein can be applied to a variety of systems (e.g., a sensor system or a robotic platform), and are not limited to autonomous vehicles. For example, similar techniques may be utilized in driver-controlled vehicles. Here, for example, the driver may issue controls (e.g., steering, acceleration, braking, etc.) and the techniques may be utilized to determine whether those controls are being carried out. As other examples, the techniques may be utilized in an aviation or nautical context. Such techniques may also be used, for example, in the context of manufacturing.

Moreover, although certain constraints are discussed above, the fault monitor system may issue additional constraints. For example, rather than stopping the vehicle, a non-operational brake caliper fault may cause the vehicle to be constrained to traveling in a particular orientation. Here, the fault monitor system may determine whether the vehicle is operating according to the constraint (e.g., a certain direction of travel), and if not, may issue the emergency stop constraint or another constraint. As another example, if a vehicle system(s) is overheating, the fault monitor system may issue a constraint that may cause the vehicle to stop within a predetermined amount of time to allow the vehicle to cool down or to travel under a certain speed. If the vehicle is not performing actions in accordance with such constraints, the fault monitor system may issue the emergency stop constraint.

Therefore, in light of the above, the techniques described herein may be directed to leveraging faults to enable a vehicle, such as an autonomous vehicle, to navigate through an environment while circumventing objects in the environment. The techniques described herein utilize information about faults occurring at, or within the vehicle, to allow the vehicle to more safely travel through the environment. The fault monitor system may centralize fault detection to reduce ambiguity, duplicity, and/or inconsistent action(s) to improve safety and increase reliability of the vehicle.

FIG. 1 is a pictorial flow diagram of an example process for receiving diagnostics(s) from vehicle system(s), managing faults, and issuing constraints according to the fault. In FIG. 1, an example environment 100 is shown that includes a vehicle 102 traversing the environment 100. For example, the vehicle 102 may be travelling on a road. In some instances, the vehicle 102 may represent a driverless vehicle, such as an autonomous vehicle. However, this is merely an example, and the systems and methods described herein may be incorporated into any ground-borne, airborne, or waterborne vehicle, including those ranging from vehicles that need to be manually controlled by a driver at all times, to those that are partially or fully autonomously controlled. The vehicle 102 is shown including a vehicle trajectory 104. In some instances, the vehicle 102 may determine the vehicle trajectory 104. For example, the vehicle 102 may determine the vehicle trajectory 104 based on sensor data received from one or more sensor system(s) on the vehicle 102. Examples of vehicle trajectories are discussed in, for example, U.S. patent application Ser. No. 16/151,607 and U.S. patent application Ser. No. 15/843,512, which are incorporated by reference herein in their entireties and for all purposes.

As the vehicle 102 travels throughout the environment 100 the vehicle 102 (or systems thereof) collects data. For example, the one or more sensor system(s) may include, for example, time of flight sensors, LIDAR sensors, RADAR sensors, SONAR sensors, image sensors, audio sensors, infrared sensors, location sensors, etc., or any combination thereof. The sensors may be disposed to capture data associated with the environment 100. In some examples, the sensor data may be processed to identify and/or classify objects in the environment 100 such as trees, vehicles, pedestrians, buildings, road surfaces, signage, barriers, road marking, or the like. Vehicle system(s) of the vehicle 102 may be configured to perform one or more functions and may rely on data captured by the sensor(s) to perform those functions. For example, drive system(s) may steer and/or control a velocity of the vehicle 102 based on captured data.

The vehicle 102 may include a fault monitor system 106 that determines constraints to be applied by, or to, the one or more vehicle system(s). The fault monitor system 106 may communicatively couple to the vehicle system(s), other device(s), and/or component(s) of the vehicle 102 for determining the constraints, or which constraints to issue for safely controlling the vehicle 102. Generally, the constraints may represent actions, commands, instructions, or requests that the vehicle system(s) are configured to perform. The vehicle system(s) may operate in accordance with the constraint(s) to control the vehicle 102, and based on the constraint(s) received from the fault monitor system 106. In some instances, this may include operating according to certain predefined parameters (e.g., speed, acceleration, braking, steering, etc.). The constraints may also include constraining the vehicle 102 to travel in certain directions, along certain routes, under certain speed thresholds, and so forth.

The constraint(s) may be transmitted by the fault monitor system 106 to the vehicle system(s). Upon receipt, the vehicle system(s) may perform various action(s) associated or consistent with the constraint(s). In some instances, the fault monitor system 106 may determine the constraint(s) based on determinations of the vehicle system(s) and/or the fault monitor system 106 itself. For example, if a collision between the vehicle 102 and an object in the environment 100 is predicted to occur, the fault monitor system 106 may issue constraint(s) that are associated with performing safe maneuvers to bring the vehicle 102 to a safe stop and/or to otherwise avoid the object. Additionally, or alternatively, in other instances, the fault monitor system 106 may receive diagnostics and/or fault indication(s) from the vehicle system(s) for use in determining whether to issue the constraints associated with bringing the vehicle 102 to a safe stop. For example, in some instances, the vehicle system(s) may report current statuses, states, operations being performed, etc. and the fault monitor system 106 may determine to issue the constraints based on the diagnostics. The diagnostics, by way of example, may indicate whether the vehicle 102 (or components thereof) are overheating, whether components are not functioning properly, a loss of pressure, etc. In some instances, bringing the vehicle 102 to a safe stop, or performing a safe maneuver, may be referred to as a no-go operation.

As shown in FIG. 1, the vehicle 102 may include a safety system 108 and/or a drive manager component 110. In some instances, the safety system 108 may function to determine the likely occurrence of collisions with objects within the environment 100 and/or determine trajectories for bringing the vehicle 102 to a safe stop. For example, the safety system 108 may determine a trajectory of the vehicle 102 to avoid objects within the environment 100. The trajectories may also be determined by the safety system 108 based on detecting faults with the vehicle 102 and/or diagnostics performed on the vehicle 102.

The fault monitor system 106 communicatively couples to the vehicle system(s), such as the safety system 108 to receive various information and data. Responsive to receiving this data, in some instances, the fault monitor system 106 may issue the constraints. For example, the fault monitor system 106 may issue a constraint to the safety system 108 for performing the no-go operation. In some instances, this constraint may control or instruct the safety system 108 to determine a trajectory of the vehicle 102, a deacceleration profile to slow the vehicle 102, a steering profile to control the vehicle 102, and so forth. In some instances, the safety system 108 may instruct other vehicle system(s) to act in accordance with the determined trajectory, deacceleration profile, steering profile, and so forth.

The drive manager component 110 may control a plurality of actuators of the vehicle 102 for guiding the vehicle 102 along determined trajectories and/or according to the constraint(s). For example, the actuators may include braking actuators (e.g., brake calipers), steering actuators (e.g., hydraulic cylinders), and/or drive actuators (e.g., electric motors). More generally, the drive manager component 110 may perform functions associated with controlling steering, braking, inverters, traction system(s), parking brake(s), vehicle suspension, and the like, in association with executing a trajectory for the vehicle 102. As part of this, the drive manager component 110 may include controllers for controlling (or instructing) the actuators to perform actions in accordance with the constraint(s). That is, in response to the receiving the constraint(s), the drive manager component 110 may issue commands to the actuators for performing certain actions, such as braking by a certain degree (e.g., amount) or according to the deacceleration profile.

The drive manager component 110 may transmit diagnostics 112 to the fault monitor system 106 for use in issuing constraints. In some instances, the diagnostics 112 may be associated with a current performance of the actuators (e.g., braking, positions, etc.), a health of the actuators(s) (e.g., pressure, broken, misaligned, etc.), whether a component is on or off, a temperature, a voltage, a current, a speed, a size, a frequency, and the like. The diagnostics 112 may be analyzed by the fault monitor system 106 for use in determining whether to issue the constraints. Alternatively, the diagnostics 112 may represent faults determined by the drive manager components 110 itself. For example, if the diagnostics 112 indicate that a hydraulic brake caliper experiences a loss of pressure, the fault monitor system 106 may issue a constraint for bringing the vehicle 102 to a safe stop. In some instances, the diagnostics 112 may be reported to the fault monitor system 106 according to predetermined schedules (e.g., every 10 milliseconds, every second, every five seconds, etc.). As such, the constraints issued by the fault monitor system 106 may be responsive to determinations made by the fault monitor system 106 itself or from indications received from the drive manager component 110.

Although FIG. 1 illustrates the diagnostics 112 being received from the drive manager component 110, the fault monitor system 106 may receive diagnostics from other vehicle system(s). Additionally, the vehicle system(s) may supply the fault monitor system 106 with multiple diagnostics 112 and the fault monitor system 106 may prioritize the diagnostics 112 for issuing the constrains. For example, the diagnostics 112 may include information such as a type of fault, a severity of the fault, a threshold value associated with the fault, a requested reaction to the fault, a fault clearing mechanism, and the like. Additional details regarding how the fault monitor system 106 may receive and process the diagnostics 112 from various vehicle components can be found in U.S. patent application Ser. No. 16/539,870, U.S. patent application Ser. No. 16/539,873, and U.S. patent application Ser. No. 16/539,878, which are incorporated by reference herein in their entireties and for all purposes.

The fault monitor system may issue first constraints 114 to the safety system 108 and second constraints 116 to the drive manager component 110. In general, the first constraints 114 and the second constraints 116 may include constraints for controlling an operation of the vehicle 102 (or vehicle system(s)). For example, the first constraints 114 and the second constraints 116 may be associated with performing the no-go operation, traveling under certain speed thresholds, traveling along certain routes, performing the emergency stop constraint, and so forth. As discussed herein, responsive to the first constraints 114 and the second constraints 116, the safety system 108 and the drive manager component 110 may perform various action(s), respectively. For example, the safety system 108 may determine a trajectory of the vehicle 102 and/or the drive manager component 110 may control braking, speed, suspension, and/or steering of the vehicle 102. In some instances, the safety system 108 and/or the drive manager component 110 may perform the action(s) according to pre-programed instructions (e.g., deacceleration profile). Therein, the safety system 108 and the drive manager component 110 may execute the constraint(s), or actions associated therewith, for controlling the vehicle 102.

Turning to the flow diagram in FIG. 1, an operation 118 may include receiving an indication associated with performing a no-go operation. For example, the fault monitor system 106 may receive the diagnostics 112 from the drive manager component 110, the fault monitor system 106 may receive an indication of a predicted collision from the safety system 108, the fault monitor system 106 may receive an indication of a fault or error occurring at the vehicle 102, and so forth. In some instances, these indications may be generated by vehicle system(s) (or sensor(s) thereof) of the vehicle 102. However, it is to be understood that the fault monitor system 106 may receive other indications associated with performing the no-go operation and bringing the vehicle 102 to a safe stop. In some examples, the no-go operation may include a first stopping trajectory.

An operation 120 may include determining one or more constraints for vehicle system(s). For example, responsive to receiving the indication associated with performing the no-go operation, the fault monitor system 106 may determine constraint(s) associated with performing the no-go operation. In some instances, this may involve the fault monitor system 106 determining constraints for respective vehicle system(s) of the vehicle 102, or which vehicle system(s) the fault monitor system 106 is to issue the constraints. For example, the fault monitor system 106 may determine the first constraint 114 for the safety system 108 and the second constraint 116 for the drive manager component 110. However, the fault monitor system 106 may determine additional constraints for additional vehicle system(s).

An operation 122 may include transmitting the one or more constraint(s) to the vehicle system(s). For example, the fault monitor system 106 may transmit the first constraint 114 to the safety system 108 and the second constraint 116 to the drive manager component 110. The first constraint 114 and the second constraint 116 may supersede previous constraints issued by the fault monitor system 106, or previous constraints received by the safety system 108 and/or the drive manager component 110. In some instances, the first constraint 114 and the second constraint 116 may respectively cause the safety system 108 and the drive manager component 110 to perform, or control, certain operations of the vehicle 102. For example, responsive to the first constraint 114, the safety system 108 may cause other system(s) or component(s) of the vehicle 102 to perform the no-go operation. This may include, among other things, determining a trajectory of the vehicle 102 along which the vehicle 102 is to travel. Additionally, responsive to the second constraint 116, the drive manager component 110 may control actuator(s) of the vehicle 102 for braking, steering, etc. This may include determining a deacceleration profile associated with bringing the vehicle 102 to a stop or controlling the vehicle 102 according to the deacceleration profile. The deacceleration profile may be determined, at least in part, based on the trajectory of the safety system 108 or the safety system 108 may determine the deacceleration profile. In this sense, the first constraint 114 and the second constraint 116 issued by the fault monitor system 106 may set constraints upon the vehicle 102 for operating within certain parameters and according to certain conditions.

However, in some instances, the vehicle system(s) may not be functioning properly (e.g., unresponsive, broken, etc.). For example, even though the fault monitor system 106 may transmit the second constraint 116 to the drive manager component 110, braking assemblies may not be braking in accordance with the no-go operation. In some instances, this may include a lack of braking being applied and/or an amount of braking being less than expected. In other words, the no-go operation may include a certain level of braking and the braking assemblies may not be braking as expected. In such instances, the fault monitor system 106 may determine that the vehicle 102 is not performing as expected or according to the constraint(s) (e.g., the no-go operation). In some instances, the fault monitor system 106 may receive an indication from the safety system 108 (or other vehicle system(s)) indicating that the vehicle 102 is not braking sufficiently to avoid the collision with the object.

An operation 124 may include determining that the vehicle system(s) have yet to perform an action consistent with the one or more constraint(s). For example, the fault monitor system 106 and/or the drive manager component 110 may determine that the vehicle 102 is not braking as expected. In some instances, this determination may be made based on feedback received from the drive manager component 110, such as the diagnostics 112. For example, the drive manager component 110 may transmit the diagnostics 112 associated the actuator(s) current state and based on this information, the fault monitor system 106 may determine the lack of braking (or insufficient braking) according to the no-go operation. Additionally, or alternatively, the drive manager component 110 may determine that the actuators are not performing in accordance with the constraint along the trajectory and transmit an indication to the fault monitor system 106.

Additionally, or alternatively, the fault monitor system 106 may determine a lack of braking based on a lack of response from the drive manager component 110. For example, after transmitting the second constraint 116, the fault monitor system 106 may begin a timer. If the fault monitor system 106 does not receive an indication that an action is being performed consistent with the no-go operation (e.g., braking, steering, etc.), the fault monitor system 106 may determine a lack of action. Still, in other instances, the fault monitor system 106 may determine the lack of braking based on the diagnostics 112, data received from other sensor(s) of the vehicle (e.g., an odometer, accelerator, etc.), and so forth. Here, the fault monitor system 106 may determine that the vehicle system(s) are not performing according to the issued constraint(s).

An operation 126 may include determining one or more additional constraint(s) for the vehicle system(s) associated with performing an emergency stop. For example, if the fault monitor system 106 determines, or otherwise receives an indication, that the vehicle 102 is not performing in accordance with the one or more constraint(s), the fault monitor system 106 may issue the one or more additional constraint(s). These one or more additional constraint(s) may include applying a maximum amount of braking, locking the steering, and/or slowing the vehicle 102 as quickly, and safely, as possible. In some examples, the operation 126 may include a second stopping trajectory. This may include, without limitation, applying emergency brake(s), reducing an acceleration and/or speed of the vehicle 102, limiting power to drive mechanisms of the vehicle 102, preparing for collision, etc. Additionally, the one or more additional constraint(s) transmitted to the safety system 108 may include the safety system 108 controlling the vehicle 102 to follow a trajectory to navigate to a side of the road. Once on the side of the road, the vehicle 102 may be placed in a safety state, for example, in which some or all functionality is disabled. For instance, the vehicle 102 may be controlled to remain in a parked state in which travelling is prohibited. The vehicle 102 may remain in this state until further diagnostics or the like are carried out.

Alternatively, the safety system 108 may determine an updated trajectory for performing the emergency stop. For example, the safety system 108 may determine an updated trajectory for the emergency stop. This updated trajectory may be provided to other vehicle system(s). For example, the drive manager component 110 may control actuators according to the updated trajectory to brake the vehicle 102. Noted above, this may include adjusting a braking level of the vehicle 102. The emergency stop constraint, as alluded to above, may apply more restrictive constraints that the previously issued constraint (e.g., maximum braking). In other words, the no-go operation may include a first level of braking and the emergency stop may include a second level of braking that is greater than the first level of braking (being as the vehicle 102 has less time to stop).

An operation 128 may include transmitting the one or more additional constraint(s) to the vehicle system(s). The one or more additional constraint(s) may be transmitted to the same vehicle system(s), additional vehicle system(s), and/or alternate vehicle system(s). For example, the fault monitor system 106 may transmit an additional first constraint 114 to the safety system 108 and an additional second constraint 116 to the drive manager component 110. Similar to the one or more constraint(s) issued at 122, the one or more additional constraint(s) may respectively cause the vehicle system(s) to perform action(s) consistent with performing the emergency stop.

Although FIG. 1 illustrates providing constraints to a certain vehicle system(s) (e.g., the safety system 108 and the drive manager component 110), the fault monitor system 106 may output additional constraints to other vehicle system(s). For example, in response to determining the emergency stop, the fault monitor system 106 may transmit a constraint to a user interface of display within the vehicle 102. In response, the display may present a message to passenger(s) inside of the vehicle 102 that the vehicle 102 will be stopping shortly, and/or may provide an indication to the passenger of the fault that caused the constraint to be issued.

Thus, in FIG. 1, the fault monitor system 106 may identify, on a system-by-system basis, vehicle system(s) that are not functioning properly, pose harm, and/or are not performing according to the issued constraints. In such instances, the fault monitor system 106 may issue an emergency constraint for controlling a trajectory and/or speed of the vehicle 102, for example, to bring the vehicle 102 to a safe stop. The fault monitor system 106 serves as a central location to receive diagnostics from multiple vehicle system(s), or determine whether the constraint(s) are not being performed, for use in performing the emergency constraints.

Figure 2A:
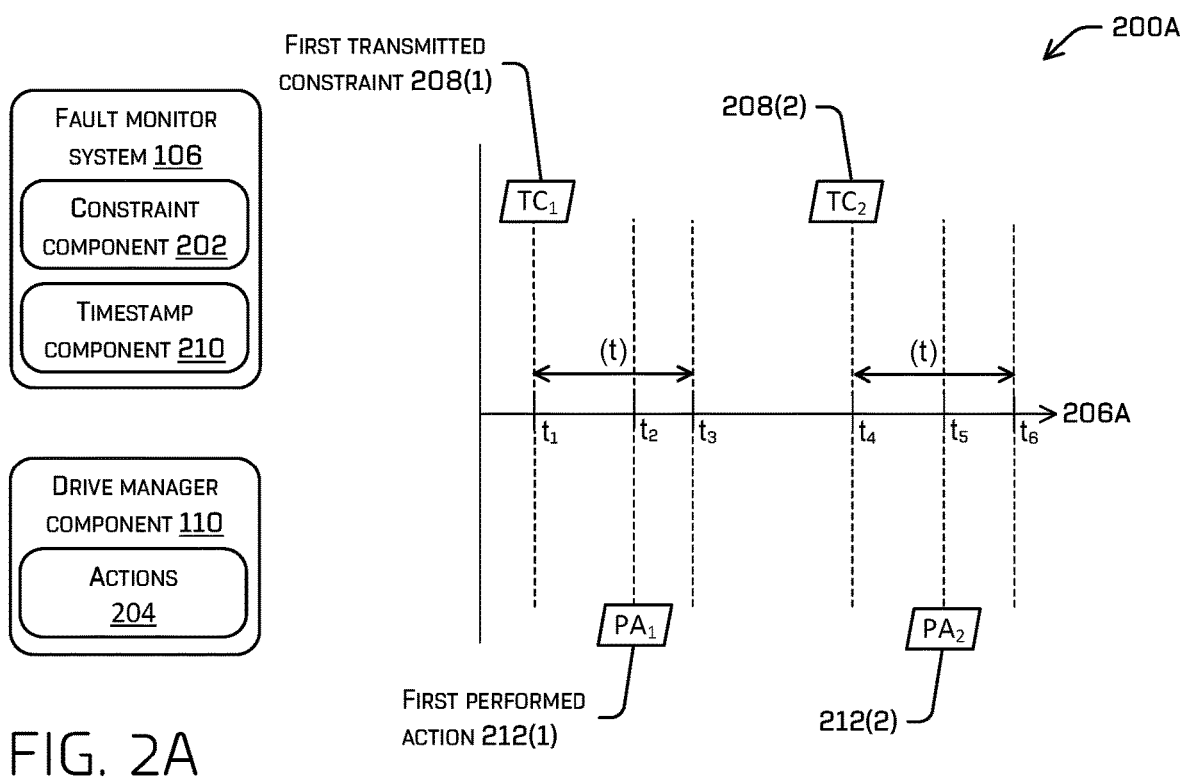
FIG. 2A illustrates an example of events associated with issuing constraints, and determining that actions are being performed in accordance with the constraints, according to an embodiment of the present disclosure.
Figure 2B:
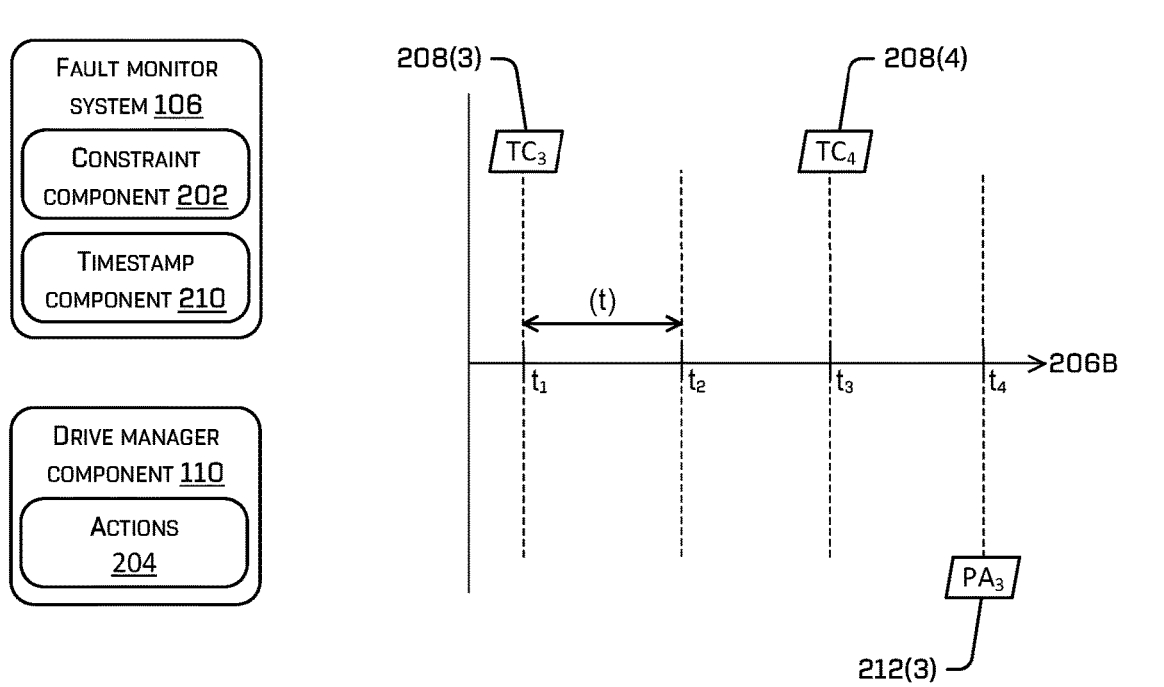
FIG. 2B illustrates an example of events associated with issuing constraints, and determining that actions are not being performed in accordance with the constraints, according to an embodiment of the present disclosure.

FIGS. 2A and 2B schematically illustrate example of events associated with the performance of constraints according to implementations of this disclosure. More specifically, FIG. 2A illustrates an example of events 200A in which action(s) are performed in accordance with a given constraint. FIG. 2B illustrates an example of events 200B in which action(s) are not performed in accordance with a given constraint.

In FIG. 2A, the fault monitor system 106 is shown issuing constraints to the vehicle system(s). In some instances, the fault monitor system 106 includes a constraint component 202 that generates the constraints. As discussed above, the constraints may be generated, determined, and otherwise transmitted to the vehicle system(s) for causing action(s) to be performed. In some instances, the constraint component 202 may represent a system component configured to publish (e.g., output) data to the vehicle system(s) associated with the constraints. The drive manager component 110, which is representative of one of the vehicle system(s), may be configured to receive data, including the data published by the constraint component 202. Based on receiving the constraint(s), the drive manager component 110 may control the vehicle 102. For example, the drive manager component 110 may issue the commands to be performed by a steering assembly, braking assembly, and/or motor assembly. In some instances, the drive manager component 110 may be responsible for determining actions 204 to be performed by the steering assembly, braking assembly, and/or motor assembly based on receiving a given constraint from the fault monitor system 106.

The example of events 200A includes a timeline 206A that generally illustrates transmitted constraints 208 by the constraint component 202. The transmitted constraints 208 may be representative of messages or communications transmitted from the fault monitor system 106 to the drive manager component 110. In some instances, the constraint component 202 may transmit the transmitted constraints 208 based on the diagnostics 112 received from other vehicle system(s), through monitoring a performance of the vehicle 102, and/or other requests received by the vehicle system(s) associated with requesting constraints (e.g., predicted collision). For example, responsive to the safety system 108 determining to perform a safe maneuver, or no-go operation, the fault monitor system 106 may transmit an associated constraint to the vehicle system(s), such as the drive manager component 110, for taking the actions 204. Additionally, the drive manager component 110 may monitor the braking assembly, the steering assembly, and/or the drive assembly to determine whether the vehicle 102 is functioning as expected and transmit the diagnostics 112 to the fault monitor system 106 for use in issuing the constraints.

As also illustrated in FIG. 2A, the fault monitor system 106 includes a timestamp component 210. In some instances, the timestamp component 210 may generate a timestamp at a time of transmitting the transmitted constraints 208. For example, a first transmitted constraint 208(1) is shown being issued at time t1. Responsive to transmitting the first transmitted constraint 208(1), the fault monitor system 106 may begin a timer. Generally, the timer may represent a threshold amount of time (t) associated with receiving a response from the drive manager component 110 (or another component and/or system) associated with performed actions 212. For example, if the first transmitted constraint 208(1) is associated with performing a safe maneuver, the fault monitor system 106 may expect the drive manager component 110 to control braking of the vehicle 102 or to brake according to a deacceleration profile associated with performing the safe maneuver. If performed actions 212 are undertaken, this may indicate that the vehicle 102 is performing as expected or that vehicle system(s) is responding to the first transmitted constraint 208(1) as expected.

Additionally, or alternatively, the drive manager component 110 may include a timestamp component for determining when the constraints are received and whether the drive manager component 110 is performing actions consistent with the constraints within the threshold amount of time (t). For example, if the drive manager component 110 is instructed to brake by a certain amount, and after the threshold amount of time (t) elapses, the drive manager component 110 may determine whether the vehicle 102 is sufficiently braking.

As shown on the timeline 206A, the drive manager component 110 may report a first performed action 212(1). Rather than the drive manager component 110 reporting the first performed action 212(1), the fault monitor system 106 may otherwise determine the first performed action 212(1) (e.g., sensor data, the diagnostics 112, etc.). The first performed action 212(1) is shown being performed at time t2. As noted above, the drive manager component 110 may have caused the first performed action 212(1) to be carried out (e.g., via transmitted instructions and/or controls) or may determine that the first performed action 212(1) was carried out. For example, fault monitor system 106 may receive sensor data for knowing a current state or action being undertaken. As also illustrated, the time t2 is prior to the threshold amount of time (t) lapsing, at time t3. In other words, the fault monitor system 106 may determine the first performed action 212(1) that is consistent or associated with the first transmitted constraint 208(1).

Similarly, at time t4, a second transmitted constraint 208(2) may be issued by the fault monitor system 106. In response, the timer may begin and the fault monitor system 106 may await a response or indication of an action 204 before the threshold amount of time (t) expires. At time t5, a second performed action 212(2) is shown being carried out. For example, the steering assembly may steer the vehicle 102 on a certain trajectory (e.g., as determined by the safety system 108). The fault monitor system 106 may receive an indication of the second performed action 212(2) and compare a time associated with the performance against the threshold amount of time (t). As illustrated, because the performance of the second performed action 212(2) is prior to the threshold amount of time (t) lapsing at time t6, the fault monitor system 106 may determine that the vehicle 102 is functioning properly.

In FIG. 2B, the fault monitor system 106 is shown issuing constraints to the vehicle system(s). However, in the example of events 200B shown in FIG. 2B, the vehicle 102 may not take actions 204 consistent with the transmitted constraints 208. In the example of events 200B, a third transmitted constraint 208(3) may include a timestamp corresponding to the time t1 on a timeline 206B. Responsive to transmitting the third transmitted constraint 208(3), the fault monitor system 106 may begin a timer. Alternatively, the drive manager component may begin a timer. If the third transmitted constraint 208(3) is associated with performing a safe maneuver, the fault monitor system 106 may expect the drive manager component 110 perform operations consistent with this constraint. This may include the drive manager component 110 braking and/or steering the vehicle 102. However, in some instances, the vehicle 102 may not brake and/or steer responsive to the third transmitted constraint 208(3). That is, the drive manager component 110 may not control the braking assembly and/or steering assembly of the vehicle 102 according to the third transmitted constraint 208(3), or the braking assembly and/or steering assembly may not brake and/or steer in a manner consistent with the third transmitted constraint 208(3), respectively. For example, the vehicle 102 may not be braking in accordance with a deacceleration profile for performing a no-go operation.

After the threshold amount of time (t) has passed without receiving an indication of the performed actions 212, the fault monitor system 106 may determine to issue another constraint. Alternatively, the fault monitor system 106 may determine to issue the other constraint based on the diagnostics 112, which may indicate a current state or action being undertaken by the braking assembly and/or steering assembly. Here, the fault monitor system 106 and/or the drive manager component 110 may determine whether the actions, the diagnostics 112, a state of the braking assembly and/or the steering assembly are consistent with the third transmitted constraint 208(3). For example, the vehicle 102 may not be braking by an amount appropriate for the third transmitted constraint 208(3). Regardless, at time t2 on the timeline 206B, the fault monitor system 106 may determine that the drive manager component 110 is not performing in accordance with the third transmitted constraint 208(3).

At time t3 on the timeline 206B, the fault monitor system 106 may issue a fourth transmitted constraint 208(4). The fourth transmitted constraint 208(4) may be associated with an emergency stop of the vehicle 102 and may be issued after the threshold amount of time (t) lapses. That is, in instances where the vehicle 102 does not perform actions in accordance with the third transmitted constraint 208(3), the fourth transmitted constraint 208(4) may be issued. In some instances, the drive manager component 316 may request the fourth transmitted constraint 208(4) based on the vehicle 102 not performing in accordance within the third transmitted constraint 208(3). Responsive to the fourth transmitted constraint 208(4), the drive manager component 110 may report that a third performed action 212(3) is being undertaken. For example, the drive manager component 110 may control the braking of the vehicle 102, according to the emergency stop.

In some instances, the threshold amount of time (t) may be dynamic or static. For example, the fault monitor system 106 may determine the threshold amount of time (t) based on a current speed of the vehicle 102, the constraint(s) (e.g., safe maneuver, emergency stop, etc.), the presence of passengers in the vehicle 102, and so forth. The threshold amount of time (t) may also account for received latencies between the transmitted constraints 208 and the performed actions 212.

The example of events 200A and the example of events 200B are just one illustrative examples and it is to be understood that other vehicle system(s) (e.g., the safety system 108) may communicatively couple with the fault monitor system 106. For example, the fault monitor system 106 may transmit a constraint to the safety system 108 for determining a trajectory of the vehicle 102 during a safe maneuver.

Figure 3:
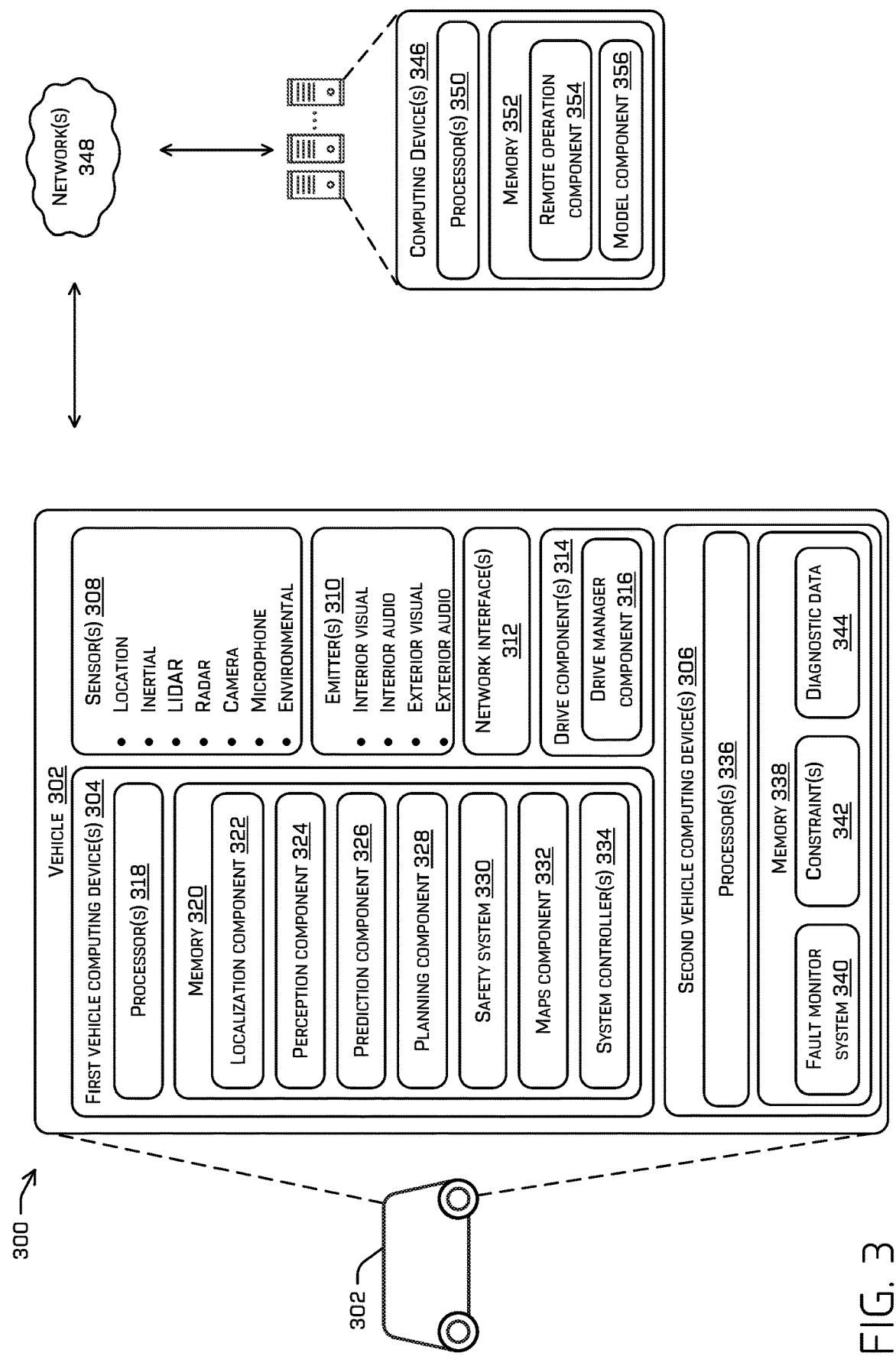
FIG. 3 illustrates a block diagram of an example system for implementing the techniques described herein, according to an embodiment of the present disclosure.

FIG. 3 depicts a block diagram of an example architecture 300 for implementing the techniques discussed herein. In some instances, the example architecture 300 may include a vehicle 302, which may represent the vehicle 102 in FIG. 1. In some instances, the vehicle 302 may be an autonomous vehicle configured to operate according to a Level 5 classification issued by the U.S. National Highway Traffic Safety Administration, which describes a vehicle capable of performing all safety-critical functions for the entire trip, with the driver (or occupant) not being expected to control the vehicle at any time. However, in other examples, the vehicle 302 may be a fully or partially autonomous vehicle having any other level or classification. Moreover, in some instances, the techniques described herein may be usable by non-autonomous vehicles as well.

The vehicle 302 may include one or more first vehicle computing device(s) 304, one or more second vehicle computing device(s) 306, one or more sensor(s) 308, one or more emitter(s) 310, one or more network interface(s) 312 (also referred to as communication devices and/or modems), and/or one or more drive component(s) 314. In some instances, the one or more sensor(s) 308 may include time-of-flight sensors, location sensors (e.g., GPS, compass, etc.), inertial sensors (e.g., inertial measurement units (IMUs), accelerometers, magnetometers, gyroscopes, etc.), lidar sensors, radar sensors, sonar sensors, infrared sensors, cameras (e.g., RGB, IR, intensity, depth, etc.), microphone sensors, environmental sensors (e.g., temperature sensors, humidity sensors, light sensors, pressure sensors, etc.), ultrasonic transducers, wheel encoders, etc. The one or more sensor(s) 308 may include multiple instances of each of these or other types of sensors. For instance, the time-of-flight sensors may include individual time-of-flight sensors located at the corners, front, back, sides, and/or top of the vehicle 302. As another example, the camera sensors may include multiple cameras disposed at various locations about the exterior and/or interior of the vehicle 302. The one or more sensor(s) 308 may provide input to the first vehicle computing device(s) 304 and/or the second vehicle computing device(s) 306.

The one or more emitter(s) 310 may emit light and/or sound. The one or more emitter(s) 310 in this example may include interior audio and visual emitters to communicate with passengers of the vehicle 302. By way of example and not limitation, interior emitters may include speakers, lights, signs, display screens, touch screens, haptic emitters (e.g., vibration and/or force feedback), mechanical actuators (e.g., seatbelt tensioners, seat positioners, headrest positioners, etc.), and the like. The one or more emitter(s) 310 in this example may also include exterior emitters. By way of example and not limitation, the exterior emitters in this example may include lights to signal a direction of travel or other indicator of vehicle action (e.g., indicator lights, signs, light arrays, etc.), and one or more audio emitters (e.g., speakers, speaker arrays, horns, etc.) to audibly communicate with pedestrians or other nearby vehicles, one or more of which may comprise acoustic beam steering technology.

The vehicle 302 may also include one or more network interface(s) 312 that enable communication between the vehicle 302 and one or more other local or remote computing device(s) (e.g., a remote teleoperation computing device) or remote services. For instance, the one or more network interface(s) 312 may facilitate communication with other local computing device(s) on the vehicle 302. Also, the one or more network interface(s) 312 may allow the vehicle 302 to communicate with other nearby computing device(s) (e.g., other nearby vehicles, traffic signals, etc.). The one or more network interface(s) 312 may include physical and/or logical interfaces for connecting the first vehicle computing device(s) 304 and/or the second vehicle computing device(s) 306 to another computing device or one or more external networks (e.g., the Internet). For example, the one or more network interface(s) 312 may enable Wi-Fi-based communication such as via frequencies defined by the IEEE 802.11 standards, short range wireless frequencies such as Bluetooth, cellular communication (e.g., 2G, 3G, 4G, 4G LTE, 5G, etc.), satellite communication, dedicated short range communications (DSRC), or any suitable wired or wireless communications protocol that enables the respective computing device to interface with the other computing device(s).

In at least one example, the vehicle 302 may include one or more drive component(s) 314. In some examples, the vehicle 302 may have a single drive component 314. In at least one example, the vehicle 302 may have multiple drive components 314, where individual drive components 314 may be positioned on opposite ends of the vehicle 302 (e.g., the front and the rear, etc.). In at least one example, the drive component(s) 314 may include the one or more sensor(s) 308 to detect conditions of the drive component(s) 314 and/or the surroundings of the vehicle 302. By way of example and not limitation, the sensor(s) 308 may include one or more wheel encoders (e.g., rotary encoders) to sense rotation of the wheels of the drive systems, inertial sensors (e.g., inertial measurement units, accelerometers, gyroscopes, magnetometers, etc.) to measure orientation and acceleration of the drive system, cameras or other image sensors, ultrasonic sensors to acoustically detect objects in the surroundings of the drive system, lidar sensors, radar sensors, etc. Some sensors, such as the wheel encoders may be unique to the drive component(s) 314. In some cases, the sensor(s) 308 on the drive component(s) 314 may overlap or supplement corresponding systems of the vehicle 302 (e.g., sensor(s) 308).

The drive component(s) 314 may include many vehicle systems, including a high voltage battery, a motor to propel the vehicle 302, an inverter to convert direct current from the battery into alternating current for use by other vehicle systems, a steering system including a steering motor and steering rack (which may be electric), a braking system including hydraulic or electric actuators, a suspension system including hydraulic and/or pneumatic components, a stability control system for distributing brake forces to mitigate loss of traction and maintain control, an HVAC system, lighting (e.g., lighting such as head/tail lights to illuminate an exterior surrounding of the vehicle), and one or more other systems (e.g., cooling system, safety systems, onboard charging system, other electrical components such as a DC/DC converter, a high voltage junction, a high voltage cable, charging system, charge port, etc.).

Additionally, the drive component(s) 314 may include a drive manager component 316, which may be the same as the drive manager component 110 discussed above in FIG. 1. In some instances, the drive manager component 316 may receive and preprocess data from the sensor(s) 308 and to control operation of the various system(s) and/or component(s) of the vehicle 302. In some examples, the drive manager component 316 may include one or more processor(s) and memory communicatively coupled with the one or more processor(s). The memory may store one or more components to perform various functionalities of the drive component(s) 314. Furthermore, the drive component(s) 314 also include one or more communication connection(s) that enable communication by the respective drive system with one or more other local or remote computing device(s).

As shown, the first vehicle computing device(s) 304 may include one or more processor(s) 318 and memory 320 communicatively coupled with the one or more processor(s) 318. In the illustrated example, the memory 320 of the first vehicle computing device(s) 304 stores a localization component 322, a perception component 324, a prediction component 326, a planning component 328, a safety system 330, which may be the same as the safety system 108 of FIG. 1, a maps component 332, and one or more system controller(s) 334. Though depicted as residing in the memory 320 for illustrative purposes, it is contemplated that the localization component 322, the perception component 324, the prediction component 326, the planning component 328, the safety system 330, the maps component 332, and the one or more system controller(s) 334 may additionally, or alternatively, be accessible to the first vehicle computing device(s) 304 (e.g., stored in a different component of vehicle 302) and/or be accessible to the vehicle 302 (e.g., stored remotely).

In the memory 320 of the first vehicle computing device(s) 304, the localization component 322 may include functionality to receive data from the sensor(s) 308 to determine a position of the vehicle 302. For example, the localization component 322 may include and/or request/receive a three-dimensional map of an environment and may continuously determine a location of the vehicle 302 within the map. In some instances, the localization component 322 may use SLAM (simultaneous localization and mapping) or CLAMS (calibration, localization and mapping, simultaneously) to receive time-of-flight data, image data, lidar data, radar data, sonar data, IMU data, GPS data, wheel encoder data, or any combination thereof, and the like to accurately determine a location of the vehicle 302. In some instances, the localization component 322 may provide data to various components of the vehicle 302 to determine an initial position of vehicle 302 for generating a trajectory, as discussed herein.

The perception component 324 may include functionality to perform object detection, segmentation, and/or classification. In some examples, the perception component 324 may provide processed sensor data that indicates a presence of an entity that is proximate to the vehicle 302 and/or a classification of the entity as an entity type (e.g., car, pedestrian, cyclist, building, tree, road surface, curb, sidewalk, unknown, etc.). In some instances, the perception component 324 may include functionality to store perception data generated by the perception component 324. In some instances, the perception component 324 may determine a track corresponding to an object that has been classified as an object type. The stored perception data may, in some examples, include fused perception data captured by the vehicle 302. Fused perception data may include a fusion or other combination of sensor data from the sensor(s) 308, such as image sensors, lidar sensors, radar sensors, time of flight sensors, sonar sensors, global positioning system sensors, internal sensors, and/or any combination of these. The stored perception data may additionally or alternatively include classification data including semantic classifications of objects (e.g., pedestrians, vehicles, buildings, road surfaces, etc.) represented in the sensor data.

The stored perception data may additionally or alternatively include track data (positions, orientations, sensor features, etc.) corresponding to motion of objects classified as dynamic objects through the environment. The track data may include multiple tracks of multiple different objects over time. This track data may be mined to identify images of certain types of objects (e.g., pedestrians, animals, etc.) at times when the object is stationary (e.g., standing still) or moving (e.g., walking, running, etc.).

In additional and/or alternative examples, the perception component 324 may provide processed sensor data that indicates one or more characteristics associated with a detected entity and/or the environment in which the entity is positioned. In some examples, characteristics associated with an entity may include, but are not limited to, an x-position (global position), a y-position (global position), a z-position (global position), an orientation, an entity type (e.g., a classification), a velocity of the entity, an extent of the entity (size), etc. Characteristics associated with the environment may include, but are not limited to, a presence of another entity in the environment, a state of another entity in the environment, a time of day, a day of a week, a season, a weather condition, an indication of darkness/light, etc.

The perception component 324 may use perception algorithms to determine a perception based bounding box associated with an object in the environment based on sensor data. For example, the perception component 324 may receive image data from the one or more sensor(s) 308 and classify the image data to determine that an object is represented in the image data. Then, using detection algorithms, the perception component 324 may generate a two dimensional bounding box and/or a perception based three dimensional bounding box associated with the object. The perception component 324 may further generate a three dimensional bounding box associated with the object. The three dimensional bounding box may provide additional information such as a location, orientation, pose, and/or size (e.g., size, width, height, etc.) associated with the object.

The prediction component 326 may generate one or more probability maps representing prediction probabilities of possible locations of one or more objects in an environment. For example, the prediction component 326 may generate one or more probability maps for vehicles, pedestrians, animals, and the like within a threshold distance from the vehicle 302. In some instances, the prediction component 326 may measure a track of an object and generate a discretized prediction probability map, a heat map, a probability distribution, a discretized probability distribution, and/or a trajectory for the object based on observed and predicted behavior. In some instances, the one or more probability maps may represent an intent of the one or more objects in the environment.

The planning component 328 may determine a path for the vehicle 302 to follow to traverse through an environment. For example, the planning component 328 may determine various routes and paths and various levels of detail. In some instances, the planning component 328 may determine a route to travel from a first location (e.g., a current location) to a second location (e.g., a target location). For the purpose of this discussion, a route may be a sequence of waypoints for traveling between two locations. As non-limiting examples, waypoints include streets, intersections, global positioning system (GPS) coordinates, etc. Further, the planning component 328 may generate an instruction for guiding the vehicle 302 along at least a portion of the route from the first location to the second location. In at least one example, the planning component 328 may determine how to guide the vehicle 302 from a first waypoint in the sequence of waypoints to a second waypoint in the sequence of waypoints. In some examples, the instruction may be a path, or a portion of a path. In some examples, multiple paths may be substantially simultaneously generated (i.e., within technical tolerances) in accordance with a receding horizon technique. A single path of the multiple paths in a receding data horizon having the highest confidence level may be selected to operate the vehicle.

In other examples, the planning component 328 may alternatively, or additionally, use data from the perception component 324 and/or the prediction component 326 to determine a path for the vehicle 302 to follow to traverse through an environment. For example, the planning component 328 may receive data from the perception component 324 and/or the prediction component 326 regarding objects associated with an environment. Using this data, the planning component 328 may determine a route to travel from a first location (e.g., a current location) to a second location (e.g., a target location) to avoid objects in an environment. In at least some examples, such a planning component 328 may determine there is no such collision free path and, in turn, provide a path which brings vehicle 302 to a safe stop avoiding all collisions and/or otherwise mitigating damage.

In some instances, the safety system 330 may determine a collision probabilities associated with the vehicle 302 and other objects. For example, the safety system 330 may determine the collision probability based on a predicted intersection associated with the vehicle 302 and the object. In some instances, the safety system 330 may determine that a collision is predicted to occur and to perform a safe maneuver or no-go operation to bring the vehicle 302 to a safe stop. The safety maneuver or no-go operation, when performed by the vehicle 302, may serve to limit a probability of the collision or reduce a likelihood of the collision occurring. The safety system 220 may also communicatively couple with other components of the vehicle 302 for determining trajectories along which the vehicle 302 is to travel. These trajectories may be determined responsive to predicted collision, faults at the vehicle 302, and so forth. For example, in instances where a collision is predicted to occur, the safety system 330 may select or determine a trajectory along which the vehicle 302 is to travel. In some instances, the safety system 330 may operate alongside or in conjunction with the planning component 328 to determine the trajectory.

The memory 320 may further include one or more map component(s) 332 that may be used by the vehicle 302 to navigate within the environment. For the purpose of this discussion, a map may be any number of data structures modeled in two dimensions, three dimensions, or N-dimensions that are capable of providing information about an environment, such as, but not limited to, topologies (such as intersections), streets, mountain ranges, roads, terrain, and the environment in general. In some instances, a map may include, but is not limited to: covariance data (e.g., represented in a multi-resolution voxel space), texture information (e.g., color information (e.g., RGB color information, Lab color information, HSV/HSL color information), and the like), intensity information (e.g., LIDAR information, RADAR information, and the like); spatial information (e.g., image data projected onto a mesh, individual "surfels" (e.g., polygons associated with individual color and/or intensity)), reflectivity information (e.g., specularity information, retroreflectivity information, BRDF information, BSSRDF information, and the like). In one example, a map may include a three-dimensional mesh of the environment. In some instances, the map may be stored in a tiled format, such that individual tiles of the map represent a discrete portion of an environment, and may be loaded into working memory as needed, as discussed herein. In at least one example, the one or more maps component 332 may include at least one map (e.g., images and/or a mesh). In some examples, the vehicle 302 may be controlled based at least in part on the maps component 332. That is, the maps component 332 may be used in connection with the localization component 322, the perception component 324 (and sub-components), the prediction component 326, and/or the planning component 328 to determine a location of the vehicle 302, identify objects in an environment, generate prediction probability(ies) associated with objects and/or the vehicle 302, and/or generate routes and/or trajectories to navigate within an environment.

In at least one example, the first vehicle computing device(s) 304 may include one or more system controller(s) 334, which may be configured to control steering, propulsion, braking, safety, emitters, communication, and other systems of the vehicle 302. These system controller(s) 334 may communicate with and/or control corresponding systems of the drive component(s) 314 and/or other components of the vehicle 302, which may be configured to operate in accordance with a path provided from the planning component 328.

The vehicle 302 may include the second computing device(s) 306 to provide redundancy, error checking, and/or validation of determinations and/or commands determined by the first computing device(s) 304. By way of example, the first computing device(s) 304 may be considered to be a primary system, while the second computing device(s) 306 may be considered to be a secondary system. The primary system may generally perform processing to control how the vehicle 302 maneuvers within an environment. The primary system may implement various Artificial Intelligence (AI) techniques, such as machine learning, to understand an environment around the vehicle 302 and/or instruct the vehicle 302 to move within the environment. For example, the primary system may implement the AI techniques to localize the vehicle 302, detect an object around the vehicle 302, segment sensor data, determine a classification of the object, predict an object track, generate a trajectory for the vehicle 302, and so on. In examples, the primary system processes data from multiple types of sensors on the vehicle 302, such as light detection and ranging (lidar) sensors, radar sensors, image sensors, depth sensors (time of flight, structured light, etc.), and the like.

In some instances, the secondary system may validate an operation of the primary system and may take over control of the vehicle 302 from the primary system when there is a problem with the primary system. As shown, the second vehicle computing device(s) 306 may include one or more processor(s) 336 and memory 338 communicatively coupled with the one or more processor(s) 336. In the illustrated example, the memory 338 of the second vehicle computing device(s) 306 stores a fault monitor system 340, which may be the same as the fault monitor system 106 of FIG. 1, constraint(s) 342, and diagnostic data 344, which may be the same as the diagnostics 112 of FIG. 1.

The fault monitor system 340 may determine faults within the vehicle 302, or within the vehicle system(s), for issuing the constraints 342. In some instances, the fault monitor system 340 receives sensor data and/or the diagnostic data 344 from the vehicle system(s) for use in determining the constraints 342. In this sense, the fault monitor system 340 may communicatively couple to the vehicle system(s) (e.g., the safety system 330) for use in determining whether the vehicle 302 is performing without faults and/or in accordance with the constraints 342. For example, the diagnostic data 344 may be received from the vehicle system(s) and indicate, or be used to determine, a state of vehicle system(s), whether the vehicle system(s) is on or off, a temperature of components within the vehicle system(s), a voltage applied to component(s), a speed of the vehicle 302, a frequency, and the like. For example, the drive component(s) 314 may report that one of the drive component(s), such as a steering actuator, is not performing as expected (e.g., reduced pressure). This diagnostic data 344 may cause the fault monitor system 340 to issue a constraint 342 for bringing the vehicle 302 to a safe stop. As part of this process, the fault monitor system 340 may issue constraints 342 to the vehicle system(s). For example, the fault monitor system 340 may issue a constraint to the drive component(s) 314 (or the drive manager component 314) to apply brakes, may issue a constraint to the safety system 330 for determining a trajectory on which to safety steer the vehicle 302, and so forth.

As such, responsive to the diagnostic data 344, the fault monitor system 340 may determine whether there are faults present in the vehicle 302, whether there are any components or vehicle system(s) of concerns, and so forth. The diagnostic data 344 may also indicate determinations made by other components of the vehicle 302. For example, the safety system 330 may determine that a collision is likely to occur between the vehicle 302 and another object. In instances where the diagnostic data 344 is indicative of a fault, or the safety system 330 determines that a collision is predicted to occur, the fault monitor system 340 may issue a corresponding constraint 342 for performing a no-go operation. The constraints 342, or instructions associated therewith, may serve to control the vehicle system(s). In other words, the vehicle system(s) may be responsive to the constraints 342 for causing certain actions to be performed. For example, in response to issuing a constraint 342 associated with performing the no-go operation, the safety system 330 may determine a safe trajectory of the vehicle 302 and/or the drive manager component 316 may determine how to brake and/or steer the vehicle 302 (e.g., deacceleration profile). In some instances, the fault monitor system 340 may output a first constraint to a first vehicle system, such as the safety system 330, and a second constraint to a second vehicle system, such as the drive component(s) 314. These constraints 342, respectively, may include actions that the vehicle system(s) are to perform, or the vehicle system(s) may themselves act in accordance with the issued constraints 342.

The fault monitor system 340 may be configured to issue a plurality of constraints 342. The constraints 342 may be associated with actions related to how the vehicle 302 itself operates. In some examples, the constraints 342 may include trajectory constraints that correspond to different types of trajectories that the vehicle 302 may be constrained to follow. The constraints 342 may further include dynamic constraints that may correspond to how the vehicle 302 may proceed through the environment, and/or restrictions on the environment that the vehicle 302 may traverse through. For example, the dynamic constraints may include feasibility parameters that may restrict environmental conditions that the vehicle 302 may traverse through, such as weather restrictions (e.g., related to snow, rain, temperature, wind speed, etc.), terrain restrictions (e.g., gravel roads, dirt roads, bridges, train tracks, etc.), a geographic region restrictions (e.g., city, suburb, rural, etc.), traffic restrictions (e.g., stop-and-go traffic, traffic traveling at a minimum or maximum speed, etc.), road network restrictions (e.g., side roads, arterials, highways, interstates, etc.), and the like. Additionally, or alternatively, the constraints 342 may include directional constraints that may constrain a direction that the vehicle 302 may proceed through the environment (e.g., restrictions on the vehicle 302 to proceed in only one of the two bi-directional directions). The constraints 342 may also correspond to power constraints that restrict power usage by one or more components and/or systems of the vehicle 302. In examples, the power constraints may include an accessory only restriction, in which functionality associated with predetermined components may be permitted (e.g., display screen, radio, lights, fan, HVAC, etc.), but other predetermined components are not permitted to operate (e.g., motor, drive controller, etc.). The constraints 342 may further include mission constraints that constrain which types of missions the vehicle 302 may undertake. For instance, an air conditioning system of the vehicle 302 may not be functioning, but other systems of the vehicle 302 may be operating properly. In this example, the vehicle 302 may be permitted to proceed to a maintenance location to receive maintenance on the air conditioning system as normal, but may not be permitted to transport passengers (due to possible temperature discomfort in a cabin of the vehicle 302). The mission constraints may also include pull-over constraints that provide instructions relating to how, where, and/or when the vehicle 302 should pull over to resolve a fault. The constraints 342 may include release constraints that provide restrictions relating to how, where, and/or when the vehicle 302 may return to normal operation when a fault is resolved. Additional details of the constraints, or ranking constraints 342, are discussed in, for example, U.S. patent application Ser. No. 16/717,913, which is incorporated by reference herein in its entirety and for all purposes.

In some instances, the diagnostic data 344 may not be indicative of faults within the vehicle 302 and the fault monitor system 340 may issue the constraints 342 based on other events. For example, batteries of the vehicle 302 may include a charge level below a certain threshold. Such charge, for example, may be determined based on the diagnostic data 344. In response, a constraint 342 may be issued to limit a speed of the vehicle 302. In this example, the vehicle 302 may not include a fault per se, such as an electrical part failure, software malfunction, mechanical failure, and so forth, but the constraint 342 may be issued responsive to certain triggering events or operating conditions. As another example, weather within an environment of the vehicle 302 may impact the constraints 342. In icy or snowy conditions, for example, a constraint 342 may be output for controlling a speed of the vehicle 302, limiting sharp turning radiuses of the vehicle 302, or limiting the vehicle 302 to certain routes. In such instances, the vehicle system(s) may transmit the diagnostic data 344 to the fault monitor system 340 (or other monitor component) for use causing the constraints 342 to be issued.

The fault monitor system 340 may determine, after issuing the constraints 342, whether the vehicle system(s) are performing in accordance with the constraints 342. For example, the fault monitor system 340 may receive the diagnostic data 344 from the vehicle system(s) for use in determining a current state, status, or actions being performed by the vehicle system(s). If these states, or indications thereof, are not received within a threshold amount of time after issuing the constraints 342, or the vehicle system(s) are not performing in accordance with the constraints 342, the fault monitor system 340 may detect a fault and output additional constraint(s). Such additional constraint(s), may include, issuing an emergency stop. The threshold amount of time may, in some instances, be static or dynamic, depending on the constraint 342 being issued, the actions being undertaken by the vehicle system(s), and/or other factors (e.g., speed of vehicle 302, environmental conditions, etc.).

The vehicle 302 may connect to computing device(s) 346 via a network 348 and may include one or more processor(s) 350 and memory 352 communicatively coupled with the one or more processor(s) 350. In at least one instance, the one or more processor(s) 350 may be similar to the processor(s) 318 and/or the processor(s) 336, and the memory 352 may be similar to the memory 320 and/or the memory 338. In the illustrated example, the memory 352 of the computing device(s) 346 stores a remote operation component 354 and/or a model component 356. In at least one instance, the model component 356, after empirical testing and/or simulations, may generate ML models to be used by the perception component 324, as discussed herein. Though depicted as residing in the memory 352 for illustrative purposes, it is contemplated that the remote operation component 354 and the model component 356 may additionally, or alternatively, be accessible to the computing device(s) 346 (e.g., stored in a different component of computing device(s) 346 and/or be accessible to the computing device(s) 346 (e.g., stored remotely).

The processor(s) 318 of the first vehicle computing device(s) 304, the processor(s) 336 of the second vehicle computing device(s) 306, and the processor(s) 350 of the computing device(s) 346 may be any suitable processor capable of executing instructions to process data and perform operations as described herein. By way of example and not limitation, the processor(s) 318, 336, and 350 may comprise one or more Central Processing Units (CPUs), Graphics Processing Units (GPUs), or any other device or portion of a device that processes electronic data to transform that electronic data into other electronic data that may be stored in registers and/or memory. In some examples, integrated circuits (e.g., ASICs, etc.), gate arrays (e.g., FPGAs, etc.), and other hardware devices may also be considered processors in so far as they are configured to implement encoded instructions.

The memory 320 of the first vehicle computing device(s) 304, the memory 338 of the second vehicle computing device(s) 306, and the memory 352 of the computing device(s) 346 are examples of non-transitory computer-readable media. The memory 320, 338, and 352 may store an operating system and one or more software applications, instructions, programs, and/or data to implement the methods described herein and the functions attributed to the various systems. In various implementations, the memory 320, 338, and 352 may be implemented using any suitable memory technology, such as static random access memory (SRAM), synchronous dynamic RAM (SDRAM), nonvolatile/Flash-type memory, or any other type of memory capable of storing information. The architectures, systems, and individual elements described herein may include many other logical, programmatic, and physical components, of which those shown in the accompanying figures are merely examples that are related to the discussion herein.

In some instances, aspects of some or all of the components discussed herein may include any models, algorithms, and/or machine learning algorithms. For example, in some instances, the components in the memory 320, 338, and 352 may be implemented as a neural network.

As described herein, an exemplary neural network is an algorithm which passes input data through a series of connected layers to produce an output. Each layer in a neural network may also comprise another neural network, or may comprise any number of layers (whether convolutional or not). As may be understood in the context of this disclosure, a neural network may utilize machine learning, which may refer to a broad class of such algorithms in which an output is generated based on learned parameters.

Although discussed in the context of neural networks, any type of machine learning may be used consistent with this disclosure. For example, machine learning or machine learned algorithms may include, but are not limited to, regression algorithms (e.g., ordinary least squares regression (OLSR), linear regression, logistic regression, stepwise regression, multivariate adaptive regression splines (MARS), locally estimated scatterplot smoothing (LOESS)), instance-based algorithms (e.g., ridge regression, least absolute shrinkage and selection operator (LASSO), elastic net, least-angle regression (LARS)), decisions tree algorithms (e.g., classification and regression tree (CART), iterative dichotomiser 3 (ID3), Chi-squared automatic interaction detection (CHAID), decision stump, conditional decision trees), Bayesian algorithms (e.g., naïve Bayes, Gaussian naïve Bayes, multinomial naïve Bayes, average one-dependence estimators (AODE), Bayesian belief network (BNN), Bayesian networks), clustering algorithms (e.g., k-means, k-medians, expectation maximization (EM), hierarchical clustering), association rule learning algorithms (e.g., perceptron, back-propagation, hopfield network, Radial Basis Function Network (RBFN)), deep learning algorithms (e.g., Deep Boltzmann Machine (DBM), Deep Belief Networks (DBN), Convolutional Neural Network (CNN), Stacked Auto-Encoders), Dimensionality Reduction Algorithms (e.g., Principal Component Analysis (PCA), Principal Component Regression (PCR), Partial Least Squares Regression (PLSR), Sammon Mapping, Multidimensional Scaling (MDS), Projection Pursuit, Linear Discriminant Analysis (LDA), Mixture Discriminant Analysis (MDA), Quadratic Discriminant Analysis (QDA), Flexible Discriminant Analysis (FDA)), Ensemble Algorithms (e.g., Boosting, Bootstrapped Aggregation (Bagging), AdaBoost, Stacked Generalization (blending), Gradient Boosting Machines (GBM), Gradient Boosted Regression Trees (GBRT), Random Forest), SVM (support vector machine), supervised learning, unsupervised learning, semi-supervised learning, etc.

Figure 4:
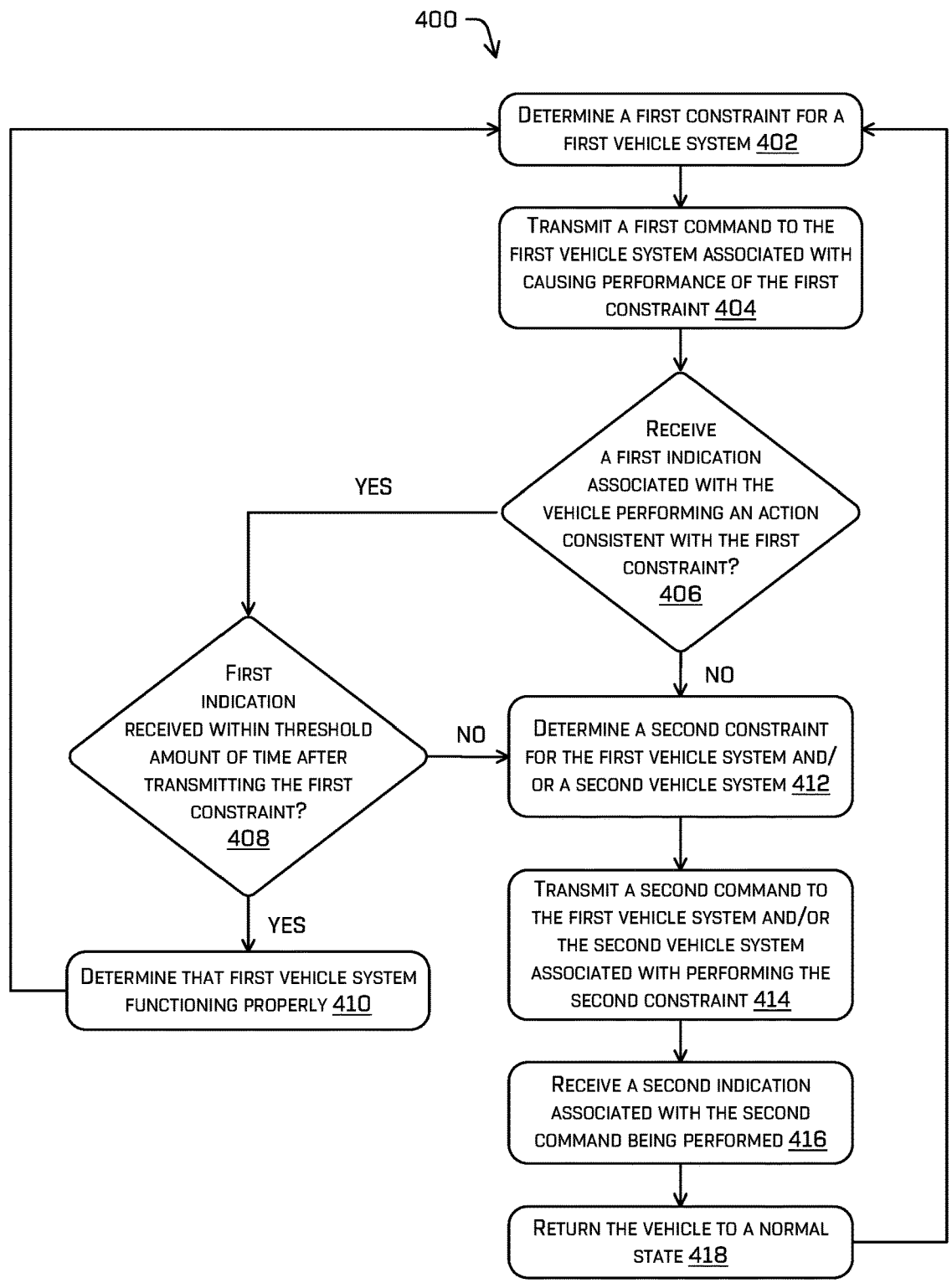
FIG. 4 illustrates an example process for issuing constraints to vehicle system(s) and/or determining faults within the vehicle system(s), according to an embodiment of the present disclosure.

FIG. 4 illustrates an example process 400 for determining constraints of the vehicle 302 and determining whether action(s) consistent with the constraint(s) 342 are being performed.

At 402, the process 400 may include determining a first constraint for a first vehicle system. In some instances, the fault monitor system 340 may determine the first constraint based at least in part on diagnostic data 344 received from vehicle system(s) of the vehicle 302. Alternatively, the fault monitor system 340 may determine the first constraint itself based on analyzing sensor data captured by the sensor(s) 308 of the vehicle 302, receiving other indications from the vehicle system(s), such as a predicted collision with an object, and so forth. For example, the fault monitor system 340 may receive an indication for performing a safe maneuver, such as a no-go operation, to avoid a collision. As another example, the diagnostic data 344 may be indicative of a faulty component within the drive component 314, a component that is worn, a component that has overheated, and so forth. In response, the fault monitor system 340 may determine the first constraint. The first constraint may control one or more operations of the vehicle 302 and based on the diagnostic data 344. For example, the safety system 330 may determine a trajectory of the vehicle 302 to bring the vehicle 302 to a safe stop.

At 404, the process 400 may include transmitting a first command to the first vehicle system associated with performing the first constraint. For example, the fault monitor system 340 may transmit the first constraint to the safety system 330. The first constraint may constrain the safety system 330, for example, to determine the trajectory for the no-go operation. This, in effect, may constrain the safety system 330 (or other route planning components) for determining the trajectory for the no-go operation, as compared to determining other trajectories. Additionally, this may include the safety system 330 instructing other components or systems of the vehicle 302 to travel along the trajectory for performing the no-go operation. For example, the drive component(s) 314 may receive the trajectory to steer and/or brake the vehicle 302 along the trajectory.

At 406, the process 400 may include determining whether a first indication is received associated with the vehicle performing an action consistent with the first constraint. For example, the fault monitor system 340 may determine whether an indication is received associated with the vehicle 302 traveling along the trajectory, whether the vehicle 302 is traveling along the trajectory according to a certain speed, and/or whether the vehicle 302 is braking. In some instances, the indication may be received by the fault monitor system 340 as part of the fault monitor system 340 receiving the diagnostic data 344. Additionally, or alternatively, in some instances the fault monitor system 340 may itself determine whether the vehicle 302 is being constrained in accordance with the first constraint (e.g., via sensor data). For example, the fault monitor system 340 may determine whether the vehicle 302 is braking according to a certain deacceleration profile along a trajectory associated with the no-go operation.

If at 406 the process 400 determines that the first indication was received, the process 400 may follow the "YES" route and proceed to 408. At 408, the process 400 may include determining whether the first indication was received within a threshold amount of time after transmitting the first constraint. For example, even though the vehicle 302 is traveling along the trajectory according to a certain speed, and/or the vehicle 302 is braking, the vehicle 302 may be performing these actions after a threshold amount of time. In other words, the process 400 may determine whether the vehicle 302 is performing the first constraint within a certain amount of time since issuing the first constraint. The fault monitor system 340 may include components (e.g., a time stamp component) for determining a time at which the first constraint was transmitted and a time at which the first indication was received (or not received). If the first indication of the vehicle 302 performing an action consistent with the first constraint is received prior to the threshold amount of time lapsing, the fault monitor system 340 may determine that the first indication was received within the threshold amount of time.

Additionally, or alternatively, the vehicle system(s), such as the drive component(s) 314 may determine whether the vehicle 302 is operating in accordance with the first constraint within the threshold amount of time. For example, the drive manager component 316 may determine whether the drive component(s) 314 are braking the vehicle 302 in accordance with the no-go operation. If so, the fault monitor system 340 may receive an indication of such, via the diagnostic data 344. If not, the fault monitor system 340 may request an updated constraint to perform an emergency stop given the lack or untimely performance of the drive component(s) 314 in accordance with the first constraint. Such updated constraint, or a request associated therewith, may be determined as part of the diagnostic data 344 indicating a lack of or untimely action.

If at 408 the process 400 determines that the first indication was received within the threshold amount of time, the process 400 may follow the "YES" route and proceed to 410. At 410, the process 400 may determine that the vehicle 302 is functioning properly (or responding to the first constraint properly). For example, the fault monitor system 340 may determine that, as a result of issuing the first constraint, that the vehicle is performing an action consistent with the first constraint. Such determination may be based at least in part on receiving the diagnostic data 344. For example, the vehicle 302 may be braking in accordance with the first constraint. From 410, the process 400 may proceed to 402 whereby the process 400 may determine additional constraints of the vehicle 302 based on received feedback.

Continuing to the rest of the process 400, FIG. 4 illustrates that the process 400 may proceed to 412 following the "NO" route from 406 or following the "NO" route from 410. For example, if the fault monitor system 340 did not receive the first indication at 406, or if the fault monitor system 340 did not receive the first indication within the threshold amount of time at 408, the process 400 may proceed to 412.

At 412, the process 400 may include determining a second constraint for the first vehicle system and/or a second vehicle system. For example, based on the vehicle 302 not performing the first constraint, or performing the first constraint within the determined threshold time, the fault monitor system 340 may determine that the vehicle 302 is not responding to the first constraint. As such, the fault monitor system 340 may determine a second constraint for constraining the vehicle 302. This may include, for example, determining the second constraint for the first vehicle system and/or the second vehicle system. In some instances, the second constraint may include performing an emergency stop, which may effectuate to apply maximum braking capabilities in a safe manner. Moreover, in some instances, the fault monitor system 340 may determine the second constraint response to a request from the drive component(s) 314. For example, the drive manager component 316 may determine that the vehicle 302 is not braking in accordance with the first constraint and request that the fault monitor system 340 issue a second constraint.

At 414, the process 400 may include transmitting a second command to the first vehicle system and/or the second vehicle system associated with performing the second constraint. For example, the fault monitor system 340 may transmit the second constraint to the safety system 330 and/or the drive component(s) 314. The second constraint may instruct the safety system 330 to determine an emergency trajectory for stopping the vehicle 302, a deacceleration profile for braking the vehicle 302, and so forth. Here, the deacceleration profile may be utilized by the drive component(s) 314 to control a braking of the vehicle 302. The emergency stop may apply more restrictive braking than an amount of braking associated with the first constraint.

At 416, the process 400 may include receiving a second indication associated with the second command being performed. For example, the fault monitor system 340 may receive the second indication from the safety system 330 and/or the drive component(s) that the vehicle 302 is performing an emergency stop, or has performed an emergency stop. The fault monitor system 340 may also make this determination based on receiving the diagnostic data 344 or other data from sensor(s) of the vehicle 302.

At 418, the process 400 may include returning the vehicle to a normal state. For example, in instances where the vehicle 302 safely stops, the fault monitor system 340 may transmit a constraint to the vehicle system(s) associated with resuming normal operations. In other instances, the vehicle 302 may operate under certain parameters (e.g., reduced speed, etc.). In some instances, the fault monitor system 340 may request releases from the second constraint before being permitted to return to normal operations. In some instances, the vehicle 302 may be permitted to receive a release from a remote computing device to traverse the environment, such as, for example, described in U.S. patent application Ser. No. 16/539,870, U.S. patent application Ser. No. 16/539,873, and U.S. patent application Ser. No. 16/539,878, which are incorporated by reference herein in their entireties and for all purposes.

Figure 5:
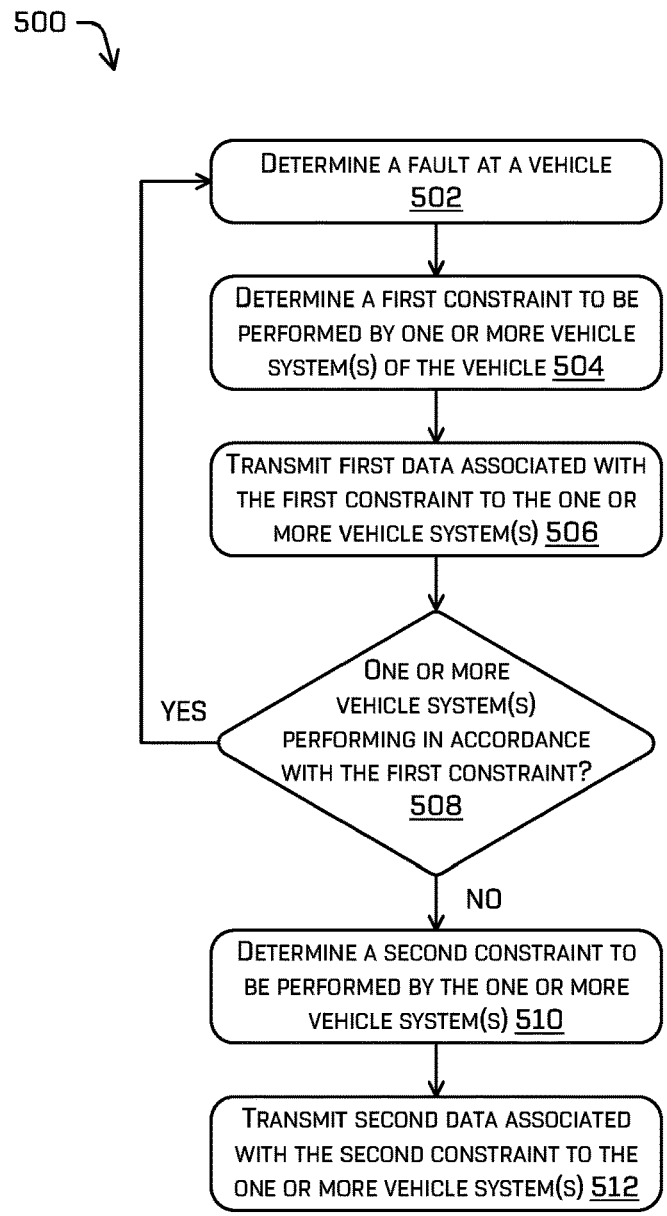
FIG. 5 illustrates an example process for issuing constraints to vehicle systems based at least in part on indications or diagnostics received from the vehicle system(s), according to an embodiment of the present disclosure.

FIG. 5 illustrates an example process 500 for determining faults at the vehicle 302, based on receiving diagnostic data 344, and outputting constraints 342 to vehicle system(s).

At 502, the process 500 may include determining a fault at a vehicle. For example, the fault monitor system 340 may receive the diagnostic data 344 from one or more of the vehicle system(s) as described above. The diagnostic data 344 may generally indicate a state, or health, of components of the vehicle 302. Alternatively, the fault monitor system 340 may receive data from other component(s) of the vehicle for use in determining a fault of the vehicle 302, or at the vehicle 302.

At 504, the process 500 may include determining a first constraint to be performed by one or more vehicle system(s) of the vehicle 302. For example, responsive to determining the fault, the fault monitor system 340 may determine a first constraint to be performed by one or more vehicle system(s). In some instances, the first constraint may be associated with mitigating the fault or resolving the fault. For example, if the diagnostic data 344 indicates that a steering actuator is unresponsive, the first constraint may include performing a safe maneuver to bring the vehicle 302 to a safe stop. In some instances, the fault monitor system 340 may map the fault to a corresponding constraint.

At 506, the process 500 may include transmitting first data associated the first constraint to the one or more vehicle system(s). For example, the fault monitor system 340 may transmit data associated with the first constraint to the drive component(s) 314 for controlling a braking, steering, and/or velocity of the vehicle 302. The first constraint may generally include an instruction or control that causes the drive component(s) 314 to perform action(s) consistent with the first constraint. For example, in response to the safe maneuver constraint, the drive component(s) 314 may slow a vehicle speed of the vehicle 302. In some instances, this may include the drive component(s) 314 interacting or communicating with other vehicle system(s). For example, the safety system 330 and/or another vehicle system may determine a trajectory along which the vehicle 302 is to travel, according to the safe maneuver. The safety system 330, for example, may provide the trajectory to the drive component(s) 314 for use by the drive component(s) 314 in controlling (e.g., braking, steering, powering, etc.) the vehicle 302 along the trajectory.

At 508, the process 500 may include determining whether the one or more vehicle system(s) are performing in accordance with the first constraint. For example, the fault monitor system 340 may determine whether the vehicle system(s) are performing actions consistent with the first constraint, or are other functioning in accordance with the first constraint. In some instances, this may include determining whether the vehicle system(s) are performing actions consistent with the first constraint, within a threshold amount of time since transmitting (or providing) the first constraint. Continuing with the example above, if the first constraint is associated with performing a safe maneuver, and to brake the vehicle 302, the fault monitor system 340 may determine whether the vehicle 302 is braking. In some instances, the fault monitor system 340 may determine whether the vehicle 302 is braking based on receiving data for sensor(s) of the vehicle 302 and/or based on receiving indications from the drive component(s) 314. For example, the drive component(s) 314 may provide an indication to the fault monitor system 340, and the fault monitor system 340 may determine that the drive component(s) 314 are performing action(s) in accordance with the first constraint. Alternatively, if the drive component(s) 314 are not braking, the fault monitor system 340 may determine that the first constraint is not being followed. As such, in proper operation, the first constraint output by the fault monitor system 340 may cause the one or more vehicle system(s) to execute an action according to the first constraint.

If at 508 the process 500 determines that the one or more vehicle system(s) are performing in accordance with the first constraint, the process 500 may follow the "YES" route and proceed to 502. At 502, the fault monitor system 340 may continue to determine faults at the vehicle 302 to ensure the safety of the passengers and/or to prevent damage to the vehicle 302. Alternatively, if at 508 the process 500 determines that the one or more vehicle system(s) are not performing in accordance with the first constraint, the process 500 may follow the "NO" route and proceed to 510.

At 510, the process 500 may include determining a second constraint to be performed by the one or more vehicle system(s). For example, as a result of determining that the vehicle system(s) are not performing in accordance with the first constraint, the fault monitor system 340 may determine a second constraint. In some instances, the second constraint may be associated with performing an emergency stop or bringing the vehicle 302 to a safe stop as quickly as possible. This may include, for example, steering the vehicle 302, applying brakes, or limiting the drive component(s) 314 powering the vehicle 302. In some instances, for the second constraint, the fault monitor system 340 may determine respective second constraints for the vehicle system(s).

At 512, the process 500 may include transmitting second data associated with the second constraint to the one or more vehicle system(s). For example, the fault monitor system 340 may transmit a second constraint to the safety system 330 associated with an emergency stop. In response, the safety system 330 may determine a trajectory on which the vehicle 302 is to travel for making the emergency stop. Additionally, or alternatively, the fault monitor system 340 may transmit a second constraint to the drive component(s) 314, and in response, the drive component(s) 314 may cause the vehicle 302 to brake and/or steer for making the emergency stop (e.g., according to the determine trajectory).

EXAMPLE CLAUSES

The following paragraphs describe various examples. Any of the examples in this section may be used with any other of the examples in this section and/or any of the other examples or embodiments described herein.

A: A system comprising: one or more processors; and one or more non-transitory computer-readable media storing instructions executable by the one or more processors, wherein the instructions, when executed by the one or more processors, cause the system to perform operations comprising: receiving, at a first computing component, diagnostic data associated with a vehicle component of a vehicle; determining, at the first computing component and based at least in part on the diagnostic data, a first fault associated with the vehicle; sending, by the first computing component and based at least in part on the first fault, a first request to a second computing component to control the vehicle to follow a first stopping trajectory; determining, at a third computing component, that a threshold amount of time has elapsed without the vehicle performing an action consistent with the first stopping trajectory; determining, at the third computing component and based at least in part on the threshold amount of time elapsing, a second fault; determining, at the first computing component and based at least in part on the second fault, to control the vehicle to follow a second stopping trajectory; and controlling the vehicle based at least in part on the second stopping trajectory.

B: The system of paragraph A, the operations further comprising determining, at the third computing component, that the vehicle is deaccelerating by an amount that is less than a threshold amount, and wherein determining the second fault is further based at least in part on the vehicle deaccelerating by the amount that is less than the threshold amount.

C: The system of paragraphs A or B, wherein: the first stopping trajectory is associated with a first amount of braking to be applied by the vehicle; and the second stopping trajectory is associated with a second amount of braking to be applied by the vehicle, the second amount of braking being greater than the first amount of braking.

D: The system of any of paragraphs A-C, wherein the diagnostic data is associated with at least one of: an unresponsive component of the vehicle; a damaged component of the vehicle; or a worn component of the vehicle.

E: A method comprising: determining, based at least in part on diagnostic data associated with a vehicle, a first constraint to be applied by a system of the vehicle; transmitting, at a first instance, the first constraint to the system of the vehicle; determining that an action associated with the first constraint has not been performed within a threshold period of time; determining, based at least in part on the action not being performed within the threshold period of time, a second constraint to be applied by the system; and transmitting, at a second instance that is after the first instance, the second constraint to the system.

F: The method of paragraph E, wherein the diagnostic data is indicative of at least one of: a fault at the vehicle; environmental conditions within an environment of the vehicle; or an operational state of the system or a second system of the vehicle.

G: The method of paragraphs E or F, further comprising transmitting, at a third instance, a third constraint to a second system of the vehicle, wherein the third instance is prior to the second instance.

H: The method of any of paragraphs E-G, further comprising receiving, from the system, a request associated with issuing the second constraint, and wherein transmitting the second constraint is further based at least in part on receiving the request.

I: The method of any of paragraphs E-H, wherein: the first constraint is associated with a first trajectory of the vehicle and a first amount of braking of the vehicle along the first trajectory; and the second constraint is associated with a second trajectory and a second amount of braking of the vehicle along the second trajectory, the second amount of braking being greater than the first amount of braking.

J: The method of any of paragraphs E-I, wherein the system is configured to determine: a first action to perform that is responsive to the first constraint; and a second action to perform that is responsive to the second constraint.

K: The method of any of paragraphs E-J, further comprising: receiving, from the system, an indication associated with a deacceleration of the vehicle; and determining that the deacceleration is inconsistent with the first constraint, wherein determining the second constraint is based at least in part on the deacceleration being inconsistent with the first constraint.

L: The method of any of paragraphs E-K, further comprising determining a fault associated with the vehicle, and wherein determining the first constraint is based at least in part on determining the fault.

M: The method of any of paragraphs E-L, wherein the system is configured to perform the second constraint based at least in part on an instruction received from a second system of the vehicle.

N: One or more non-transitory computer-readable media storing instructions that, when executed by one or more processors, cause the one or more processors to perform operations comprising: determining, based at least in part on diagnostic data associated with a vehicle, a first constraint to be applied by a system of the vehicle; transmitting, at a first instance, the first constraint to the system of the vehicle; determining that an action associated with the first constraint has not been performed within a threshold period of time; determining, based at least in part on the action not being performed within the threshold period of time, a second constraint to be applied by the system; and transmitting, at a second instance that is after the first instance, the second constraint to the system.

O: The one or more non-transitory computer-readable media of paragraph N, wherein the diagnostic data is indicative of at least one of: a fault at the vehicle; environmental conditions within an environment of the vehicle; or an operational state of the system or a second system of the vehicle.

P: One or more non-transitory computer-readable media of paragraphs N or O, the operations further comprising: receiving, from the system, an indication associated with a deacceleration of the vehicle; and determining that the deacceleration is inconsistent with the first constraint, wherein determining the second constraint is based at least in part on the deacceleration being inconsistent with the first constraint.

Q: The one or more non-transitory computer-readable media of any of paragraphs N-P, the operations further comprising transmitting, at a third instance, the first constraint to a second system of the vehicle, wherein the third instance is prior to the second instance.

R: The one or more non-transitory computer-readable media of any of paragraphs N-Q, wherein: the first constraint is associated with a first trajectory of the vehicle and a first amount of braking of the vehicle along the first trajectory; and the second constraint is associated with a second trajectory, and a second amount of braking of the vehicle along the second trajectory, the second amount of braking being greater than the first amount of braking.

S: The one or more non-transitory computer-readable media of any of paragraphs N-R, wherein the system is configured to determine: a first action to perform that is responsive to the first constraint; and a second action to perform that is responsive to the second constraint.

T: The one or more non-transitory computer-readable media of any of paragraphs N-S, the operations further comprising: receiving an indication associated with a fault of the system or a second system of the vehicle; and determining the first constraint is based at least in part on receiving the indication.

While the example clauses described above are described with respect to one particular implementation, it should be understood that, in the context of this document, the content of the example clauses can also be implemented via a method, device, system, computer-readable medium, and/or another implementation. Additionally, any of examples A-T can be implemented alone or in combination with any other one or more of the examples A-T.

CONCLUSION

While one or more examples of the techniques described herein have been described, various alterations, additions, permutations and equivalents thereof are included within the scope of the techniques described herein.

In the description of examples, reference is made to the accompanying drawings that form a part hereof, which show by way of illustration specific examples of the claimed subject matter. It is to be understood that other examples can be used and that changes or alterations, such as structural changes, can be made. Such examples, changes or alterations are not necessarily departures from the scope with respect to the intended claimed subject matter. While individual examples are described herein as having certain features or components, the features and components of the individual examples can be combined and used together. While the operations herein can be presented in a certain order, in some cases the ordering can be changed so that certain inputs are provided at different times or in a different order without changing the function of the systems and methods described. The disclosed procedures could also be executed in different orders. Additionally, various computations that are herein need not be performed in the order disclosed, and other examples using alternative orderings of the computations could be readily implemented. In addition to being reordered, the computations could also be decomposed into sub-computations with the same results.

The invention claimed is:

1. A system comprising:
one or more processors; and
one or more non-transitory computer-readable media storing instructions executable by the one or more processors, wherein the instructions, when executed by the one or more processors, cause the system to perform operations comprising:
receiving, at a first computing component, diagnostic data associated with a vehicle component of a vehicle, the first computing component including a fault monitor system configured to detect faults across various vehicle systems;
determining, at the first computing component and based at least in part on the diagnostic data, a first fault associated with the vehicle;
sending, by the first computing component and based at least in part on the first fault, a first request to a second computing component to control the vehicle to follow a first stopping trajectory, the second computing component including a safety system configured to determine a safe maneuver;
determining, at a third computing component, a threshold amount of time for performing a deacceleration profile based at least in part on a first request type of the first request, the first request type being from a group of request types;

determining, at the third computing component, that the threshold amount of time has elapsed without the vehicle performing an action consistent with the first stopping trajectory, the third computing component including a drive manager component configured to control the vehicle, and the threshold amount of time being measured from the sending of the first request;

determining, at the third computing component and based at least in part on the threshold amount of time elapsing, a second fault;

determining, at the first computing component and based at least in part on the second fault, to control the vehicle to follow a second stopping trajectory; and controlling the vehicle based at least in part on the second stopping trajectory.

2. The system of claim 1, the operations further comprising determining, at the third computing component, that the vehicle is deaccelerating by an amount that is less than a threshold amount indicated by the deacceleration profile, and wherein determining the second fault is further based at least in part on the vehicle deaccelerating by the amount that is less than the threshold amount.

3. The system of claim 1, wherein:
the first stopping trajectory is associated with a first amount of braking to be applied by the vehicle; and
the second stopping trajectory is associated with a second amount of braking to be applied by the vehicle, the second amount of braking being greater than the first amount of braking.

4. The system of claim 1, wherein the diagnostic data is associated with at least one of:
an unresponsive component of the vehicle;
a damaged component of the vehicle; or
a worn component of the vehicle.

5. The system of claim 1, wherein the threshold amount of time is determined dynamically by the first computing component based at least in part on at least one of a current speed of the vehicle or a presence of passengers in the vehicle.

6. A method comprising:
determining, based at least in part on diagnostic data associated with a vehicle, a first constraint to be applied by a system of the vehicle, the system of the vehicle including a safety system configured to determine a safe maneuver and a drive manager component configured to control the vehicle;
transmitting, at a first instance, by a fault monitor system, the first constraint to the system of the vehicle, the fault monitor system being configured to detect faults across various vehicle systems;
determining a threshold period of time for performing a deacceleration profile based at least in part on a first constraint type of the first constraint, the first constraint type being from a group of constraint types;
determining that an action associated with the first constraint has not been performed within the threshold period of time, wherein the threshold period of time is measured from the transmitting of the first constraint;
determining, based at least in part on the action not being performed within the threshold period of time, a second constraint to be applied by the system, the second constraint being associated with a second constraint type from the group of constraint types;

transmitting, at a second instance that is after the first instance, the second constraint to the system; and
controlling the vehicle based at least in part on the second constraint.

7. The method of claim 6, wherein the diagnostic data is indicative of at least one of:
a fault at the vehicle;
environmental conditions within an environment of the vehicle; or
an operational state of the system or a second system of the vehicle.

8. The method of claim 6, further comprising transmitting, at a third instance, a third constraint to a second system of the vehicle, wherein the third instance is prior to the second instance.

9. The method of claim 6, further comprising receiving, from the system, a request associated with issuing the second constraint, and wherein transmitting the second constraint is further based at least in part on receiving the request.

10. The method of claim 9, wherein:
the first constraint type is associated with a safe stop operation, the safe stop operation comprising a first stopping trajectory of the vehicle and a first amount of braking of the vehicle along the first stopping trajectory; and
the second constraint type is associated with an emergency stop operation, the emergency stop operation comprising a second stopping trajectory and a second amount of braking of the vehicle along the second stopping trajectory, the second amount of braking being greater than the first amount of braking.

11. The method of claim 6, wherein the system is configured to determine:
a first action to perform that is responsive to the first constraint; and
a second action to perform that is responsive to the second constraint.

12. The method of claim 6, further comprising determining a fault associated with the vehicle, and wherein determining the first constraint is based at least in part on determining the fault.

13. The method of claim 12, wherein the system is configured to perform the second constraint based at least in part on an instruction received from a second system of the vehicle.

14. The method of claim 6, wherein the action is a deacceleration, and determining that the deacceleration has not been performed within the threshold period of time comprises:
determining a distance and a time of the deacceleration;
determining, based at least in part on the distance and the time of the deacceleration, a comparison between the deacceleration and the deacceleration profile; and
determining, based at least in part on the comparison, that the deacceleration is different than the deacceleration profile,
wherein determining the second constraint is based at least in part on the deacceleration being different than the deacceleration profile.

15. One or more non-transitory computer-readable media storing instructions that, when executed by one or more processors, cause the one or more processors to perform operations comprising:
determining, based at least in part on diagnostic data associated with a vehicle, a first constraint to be applied by a system of the vehicle, the system of the vehicle including a safety system configured to determine a safe maneuver and a drive manager component configured to control the vehicle;

transmitting, at a first instance, by a fault monitor system, the first constraint to the system of the vehicle, the fault monitor system being configured to detect faults across various vehicle systems;

determining a threshold period of time for performing a deacceleration profile based at least in part on a first constraint type of the first constraint, the first constraint type being from a group of constraint types;

determining that an action associated with the first constraint has not been performed within the threshold period of time, wherein the threshold period of time is measured from the transmitting of the first constraint;

determining, based at least in part on the action not being performed within the threshold period of time, a second constraint to be applied by the system, the second constraint being associated with a second constraint type from the group of constraint types;

transmitting, at a second instance that is after the first instance, the second constraint to the system; and controlling the vehicle based at least in part on the second constraint.

16. The one or more non-transitory computer-readable media of claim 15, wherein the diagnostic data is indicative of at least one of:
- a fault at the vehicle;
- environmental conditions within an environment of the vehicle; or
- an operational state of the system or a second system of the vehicle.

17. The one or more non-transitory computer-readable media of claim 15, the operations further comprising transmitting, at a third instance, the first constraint to a second system of the vehicle, wherein the third instance is prior to the second instance.

18. The one or more non-transitory computer-readable media of claim 15, wherein:
- the first constraint type is associated with a safe stop operation, the safe stop operation comprising a first stopping trajectory of the vehicle and a first amount of braking of the vehicle along the first stopping trajectory; and
- the second constraint type is associated with an emergency stop operation, the emergency stop operation comprising a second stopping trajectory and a second amount of braking of the vehicle along the second stopping trajectory, the second amount of braking being greater than the first amount of braking.

19. The one or more non-transitory computer-readable media of claim 15, the operations further comprising:
- receiving an indication associated with a fault of the system or a second system of the vehicle; and
- determining the first constraint is based at least in part on receiving the indication.

20. The one or more non-transitory computer-readable media of claim 15, wherein the action is a deacceleration, and determining that the deacceleration has not been performed within the threshold period of time comprises:
- determining a distance and a time of the deacceleration;
- determining, based at least in part on the distance and the time of the deacceleration, a comparison between the deacceleration and the deacceleration profile; and
- determining, based at least in part on the comparison, that the deacceleration is different than the deacceleration profile, wherein determining the second constraint is based at least in part on the deacceleration being different than the deacceleration profile.

* * * * *